United States Patent
Kai et al.

(10) Patent No.: US 8,650,385 B2
(45) Date of Patent: Feb. 11, 2014

(54) INSTRUCTION FETCH APPARATUS, PROCESSOR AND PROGRAM COUNTER ADDITION CONTROL METHOD

(75) Inventors: Hitoshi Kai, Kanagawa (JP); Hiroaki Sakaguchi, Kanagawa (JP); Hiroshi Kobayashi, Kanagawa (JP); Katsuhiko Metsugi, Kanagawa (JP); Haruhisa Yamamoto, Tokyo (JP); Yousuke Morita, Tokyo (JP); Koichi Hasegawa, Kanagawa (JP); Taichi Hirao, Tokyo (JP)

(73) Assignee: Sony Corporation, Tokyo (JP)

( * ) Notice: Subject to any disclaimer, the term of this patent is extended or adjusted under 35 U.S.C. 154(b) by 499 days.

(21) Appl. No.: 13/024,580

(22) Filed: Feb. 10, 2011

(65) Prior Publication Data

US 2011/0238952 A1    Sep. 29, 2011

(30) Foreign Application Priority Data

Mar. 29, 2010  (JP) ................................. 2010-075782

(51) Int. Cl.
*G06F 9/30* (2006.01)
*G06F 9/40* (2006.01)
*G06F 15/00* (2006.01)

(52) U.S. Cl.
USPC ........................................................ 712/205

(58) Field of Classification Search
None
See application file for complete search history.

(56) References Cited

U.S. PATENT DOCUMENTS 5,724,563 A * 3/1998 Hasegawa ..................... 712/233
7,346,741 B1 * 3/2008 Keish et al. ................... 711/137

FOREIGN PATENT DOCUMENTS

JP         4327237        6/2009

* cited by examiner

*Primary Examiner* — Corey S Faherty
(74) *Attorney, Agent, or Firm* — Oblon, Spivak, McClelland, Maier & Neustadt, L.L.P.

(57) ABSTRACT

An instruction fetch apparatus is disclosed which includes: a program counter configured to manage the address of an instruction targeted to be executed in a program in which instructions belonging to a plurality of instruction sequences are placed sequentially; a change designation register configured to designate a change of an increment value on the program counter; an increment value register configured to hold the changed increment value; and an addition control section configured such that if the change designation register designates the change of the increment value on the program counter, then the addition control section increments the program counter based on the changed increment value held in the increment value register, the addition control section further incrementing the program counter by an instruction word length if the change designation register does not designate any change of the increment value on the program counter.

5 Claims, 36 Drawing Sheets

F I G. 1
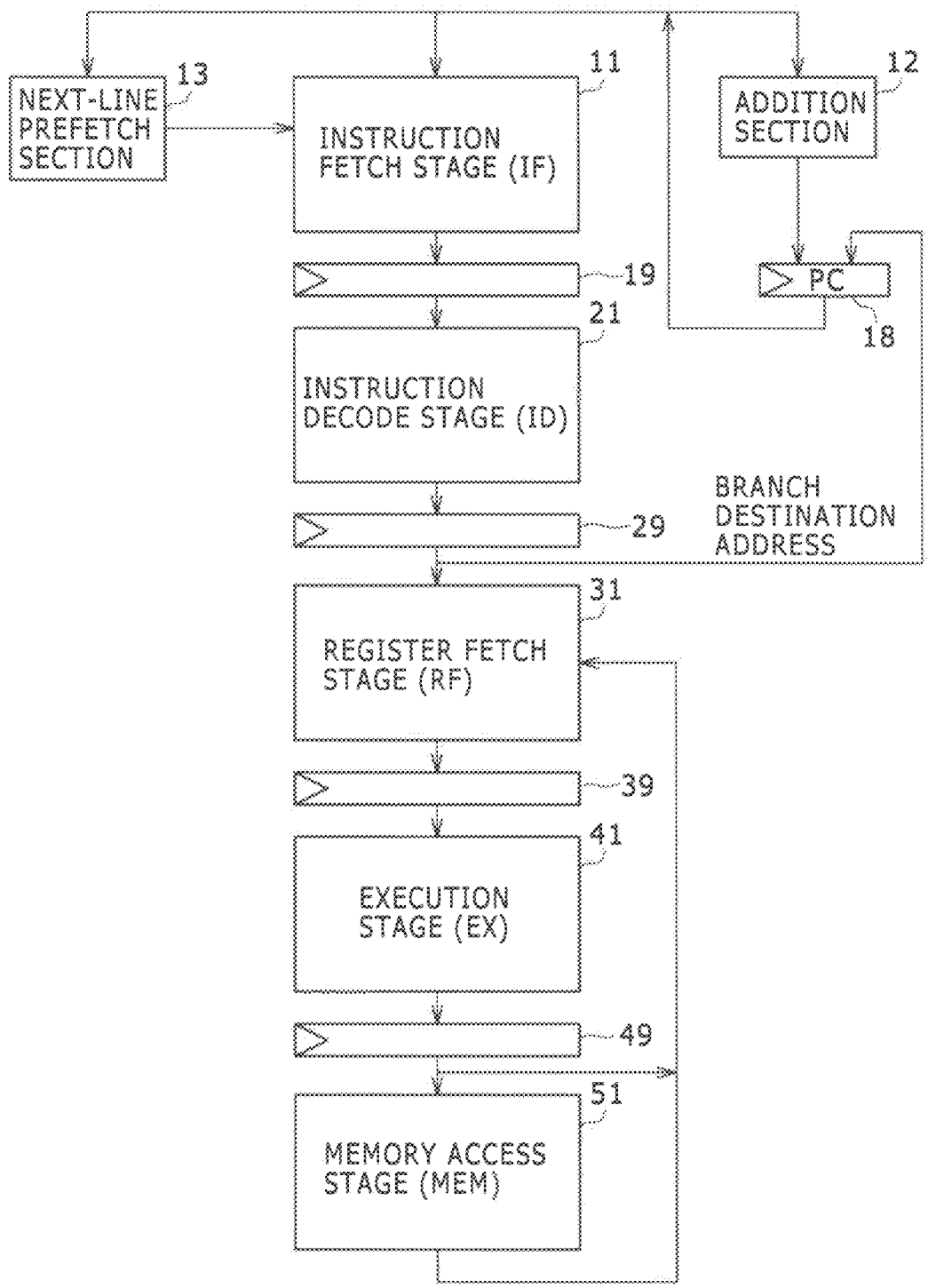

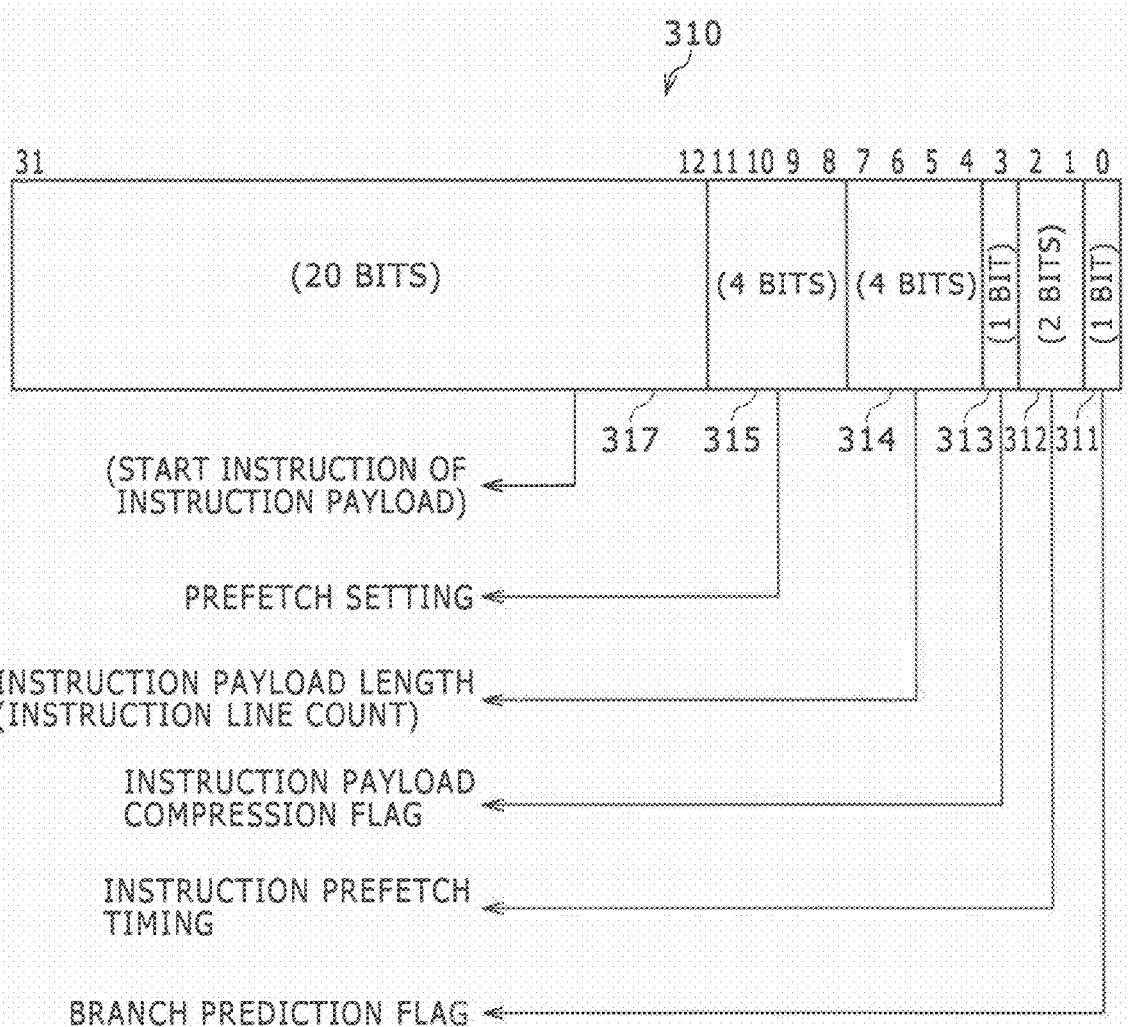

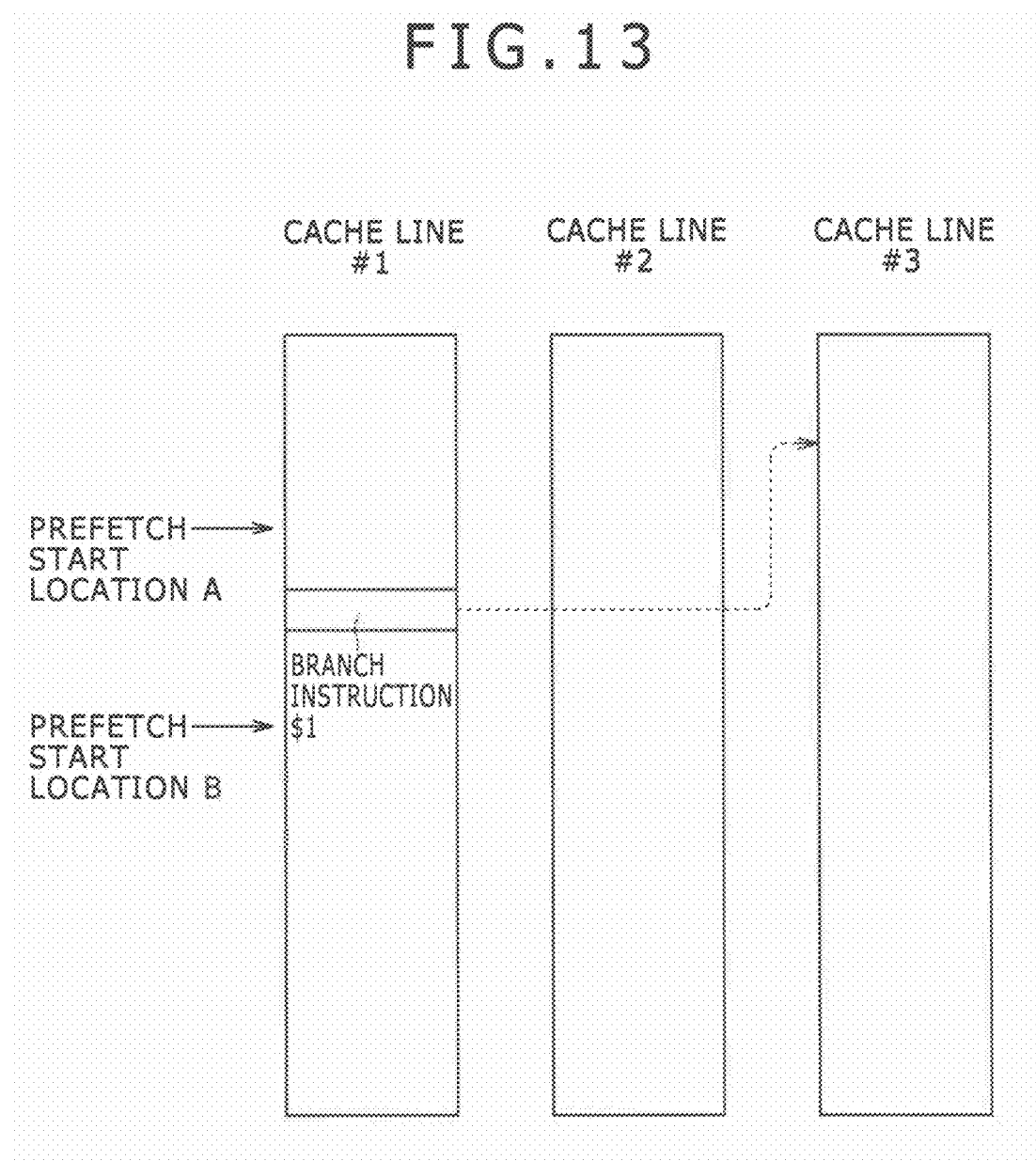

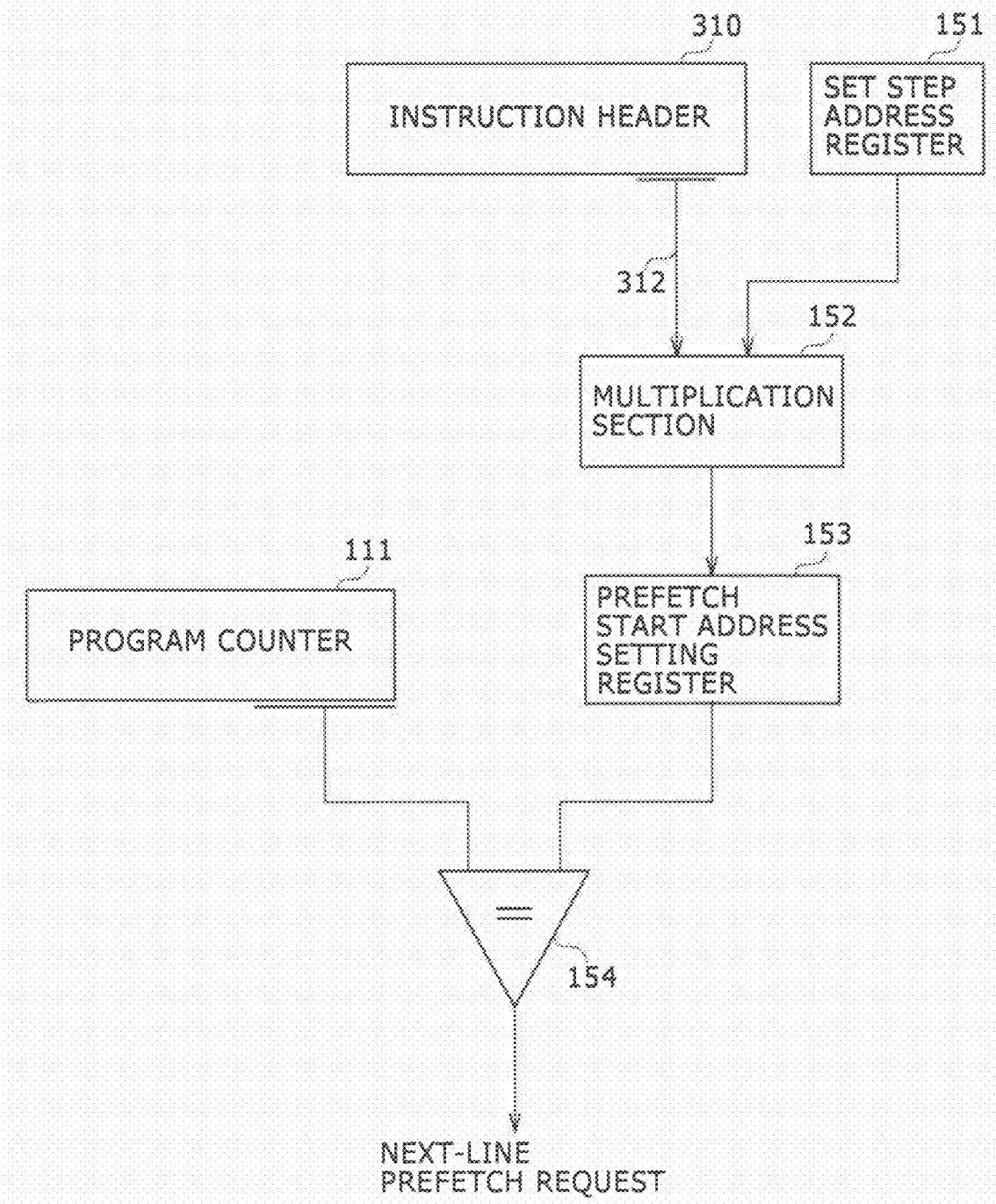

FIG.24A
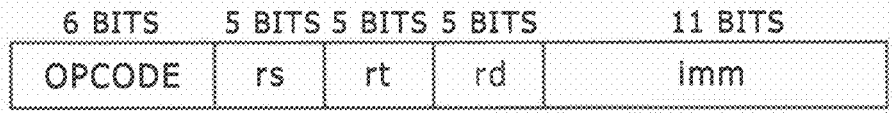
FIG.24B
|  | \multicolumn{8}{c}{BIT[28:26]} |
|---|---|---|---|---|---|---|---|---|
| BIT[31:29] | | 000 | 001 | 010 | 011 | 100 | 101 | 110 | 111 |
| | 000 | | | J | JAL | BEQ | BNE | BLEZ | BGTZ |
| | 001 | ADDI | ADDIU | ... | ... | ... | | | |
| | 010 | COP0 | COP1 | COP2 | COP3 | ... | | | |
| | 011 | | | | ... | | | | |
| | 100 | LB | LH | LWL | LW | ... | | | PCINCMODE |
| | 101 | SB | SH | SWL | SW | ... | | | |
| | 110 | | | | ... | BEQfp | BNEfp | BLEZfp | BGTZfp |
| | 111 | | | | | BLTZfp | BGEZfp | BLTZALfp | BGEZALfp |
FIG.24C
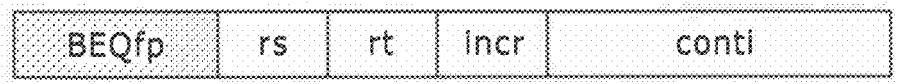
FIG.24D

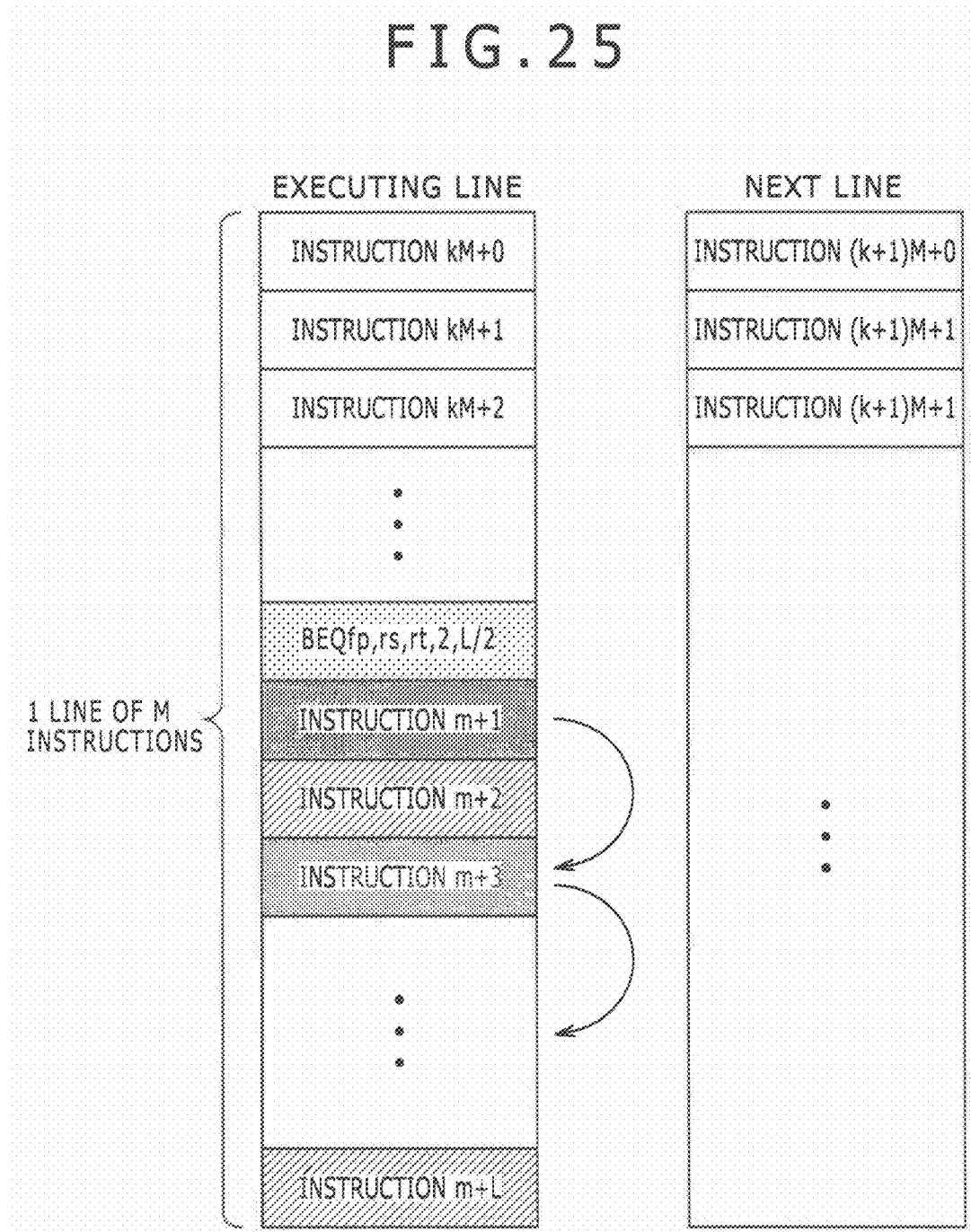

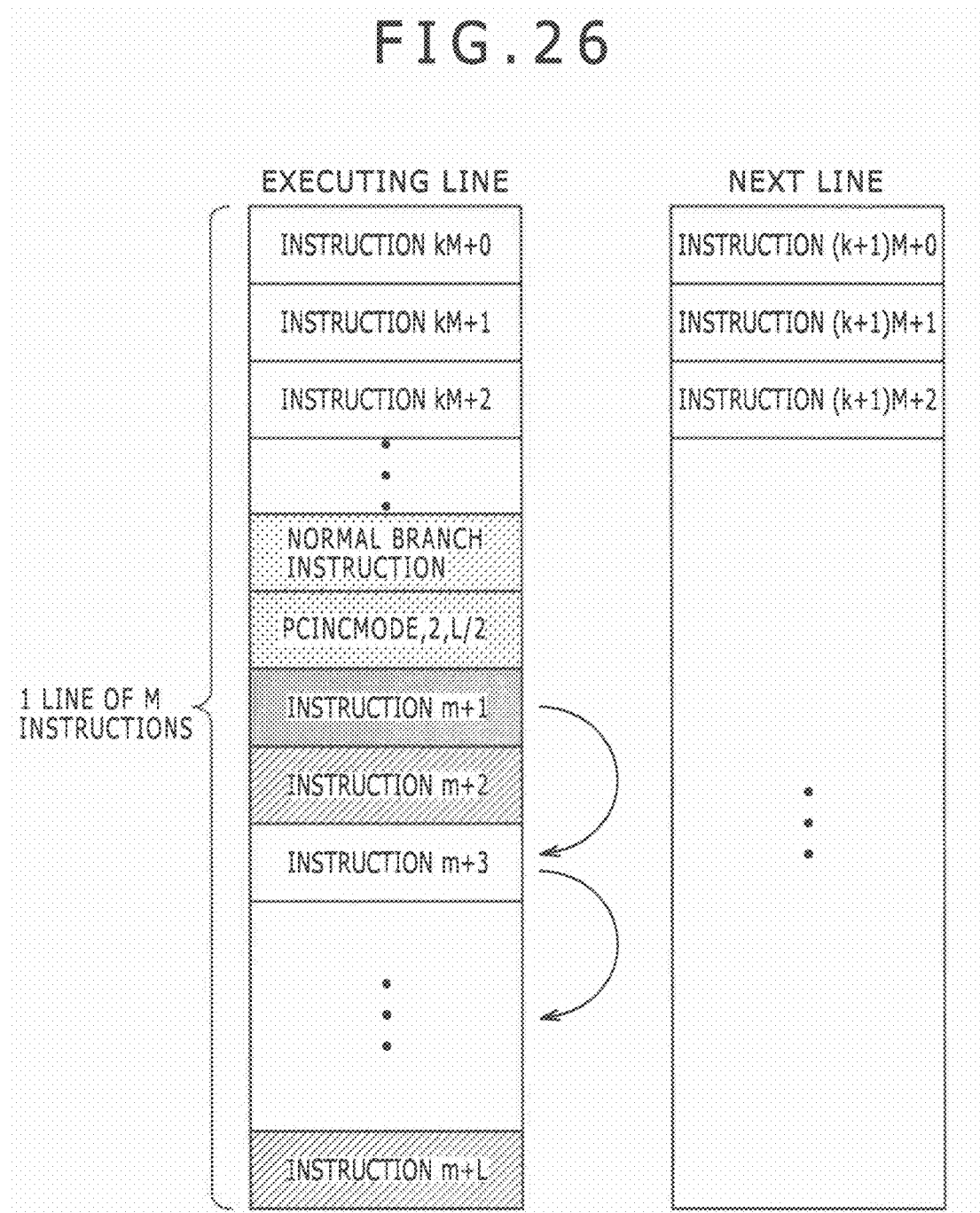

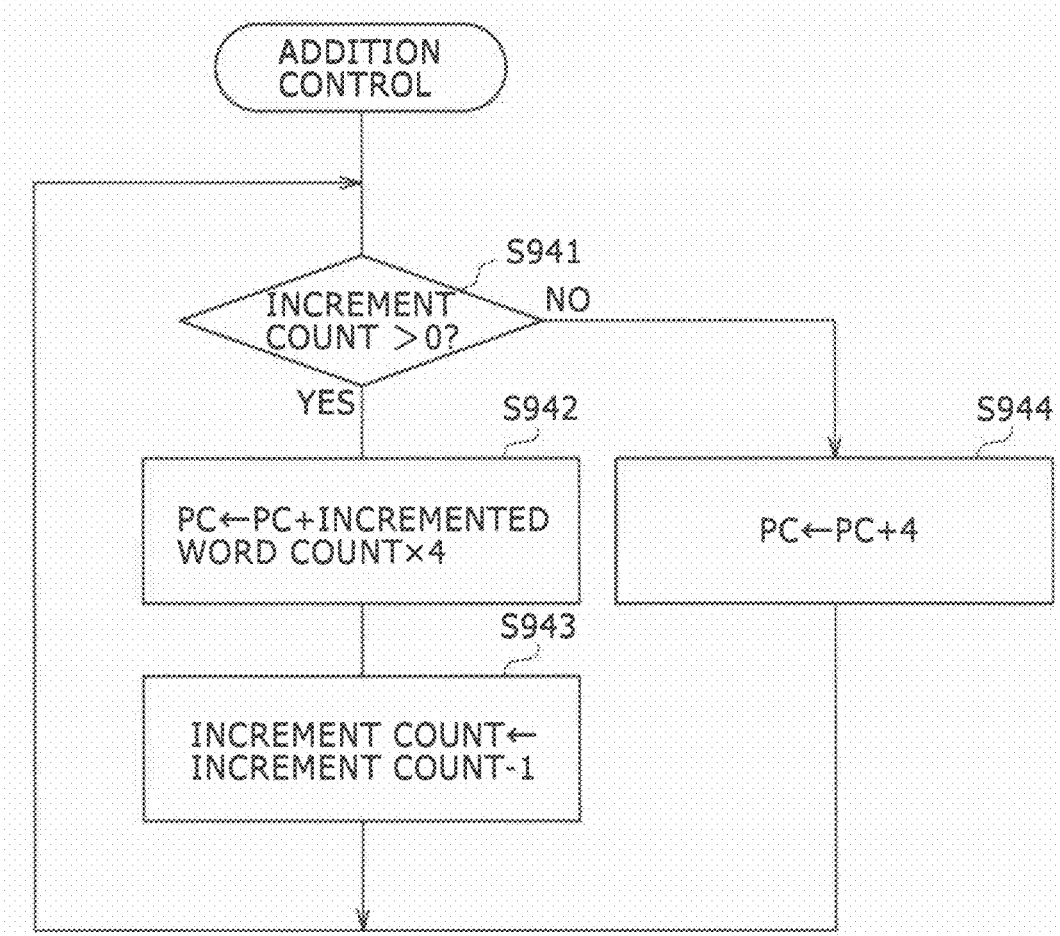

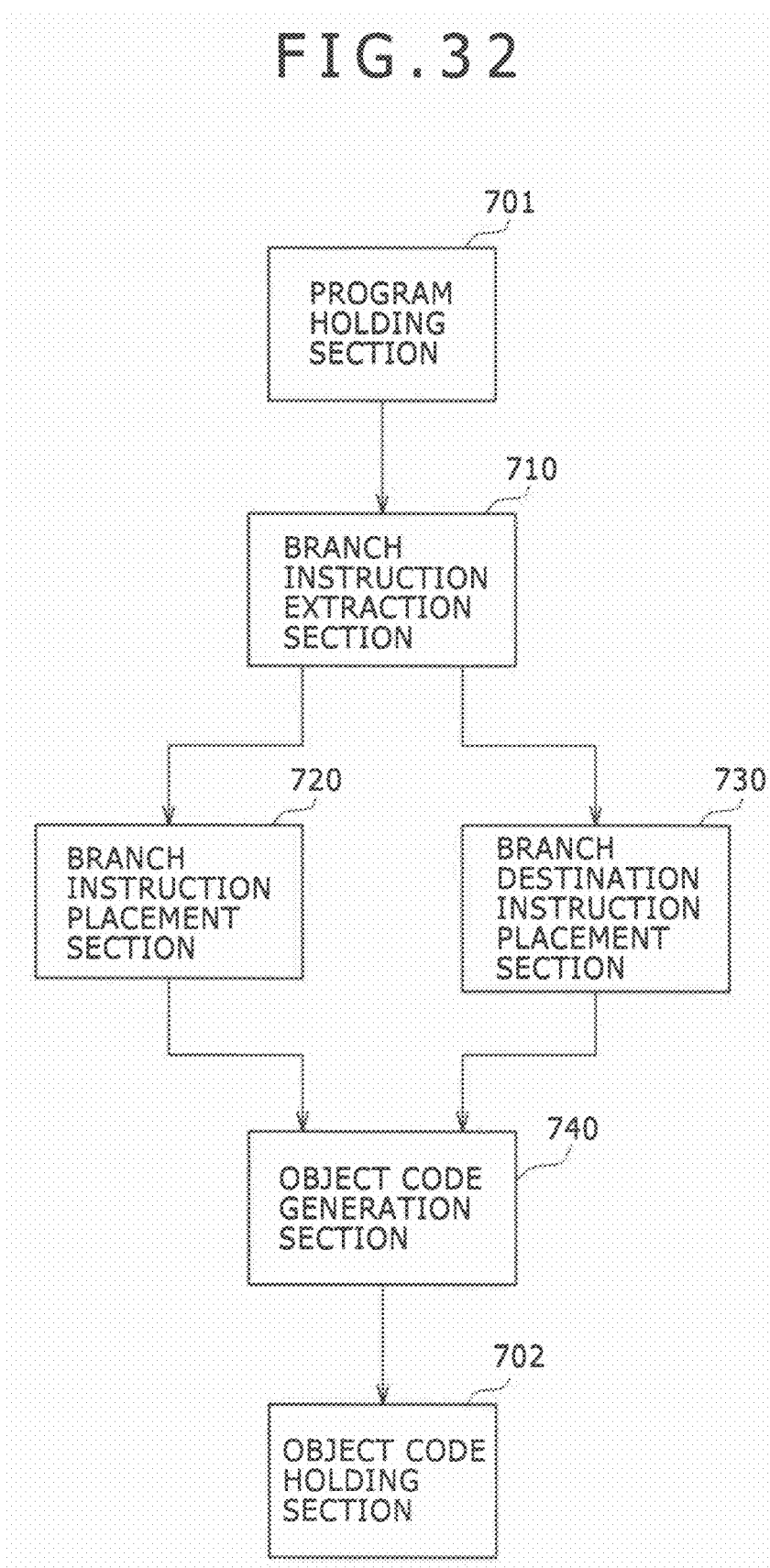

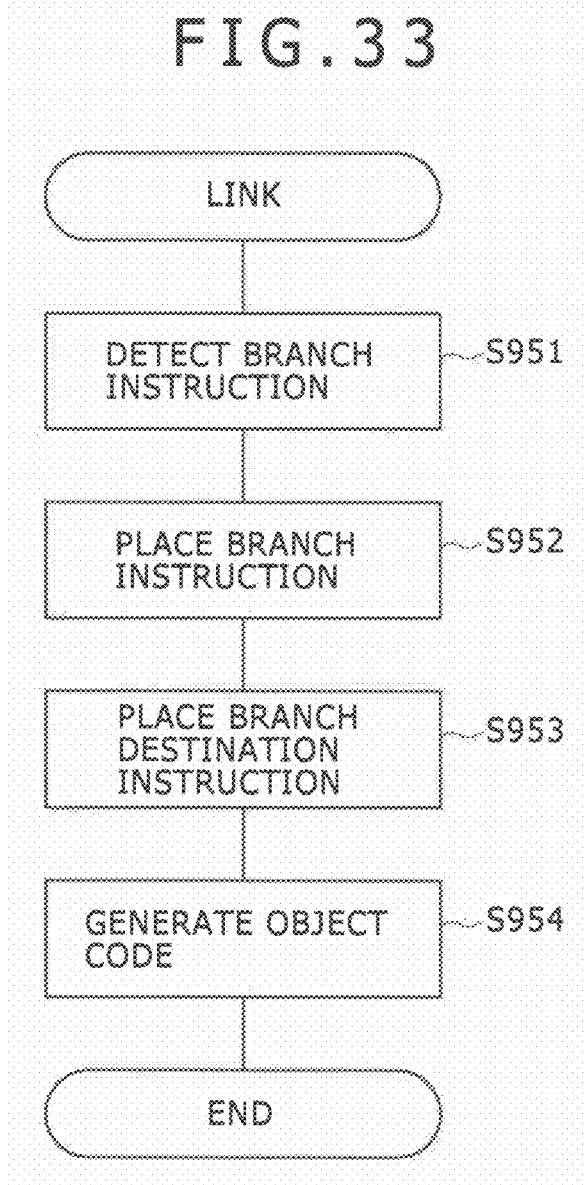

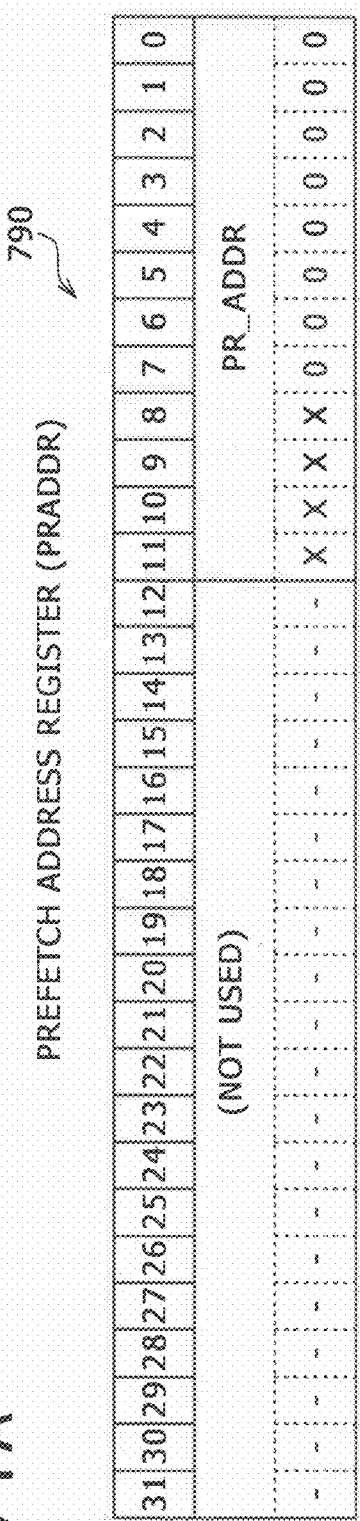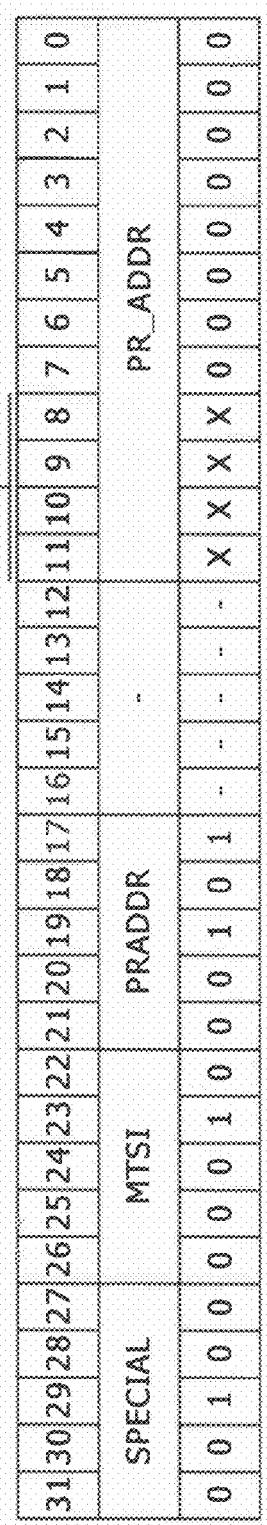
FIG. 34A
FIG. 34B

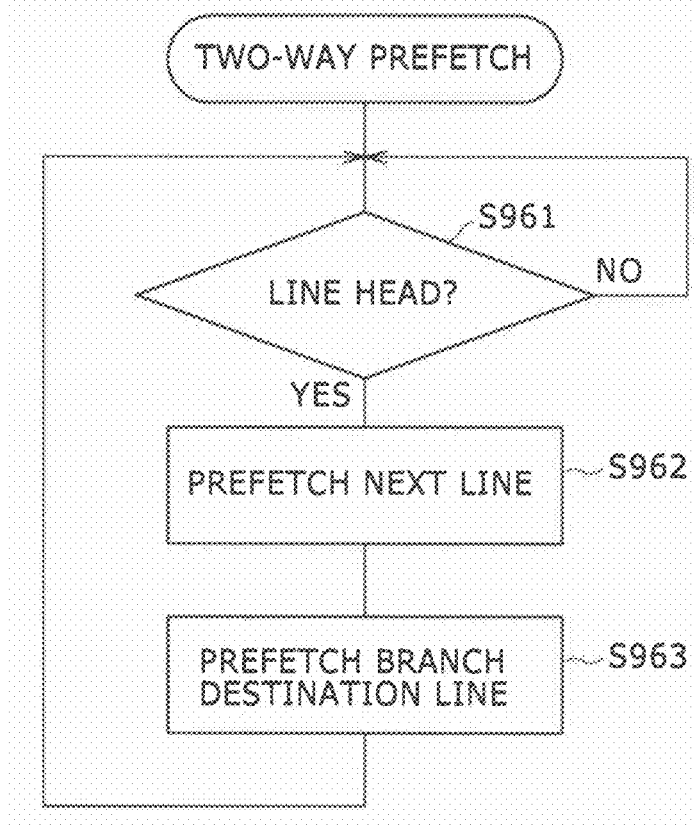

INSTRUCTION FETCH APPARATUS, PROCESSOR AND PROGRAM COUNTER ADDITION CONTROL METHOD

BACKGROUND OF THE INVENTION

1. Field of the Invention

The present invention relates to an instruction fetch apparatus. More particularly, the invention relates to an instruction fetch apparatus and a processor for prefetching an instruction sequence including a branch instruction, as well as to a processing method for use with the apparatus and processor and to a program for causing a computer to execute the processing method.

2. Description of the Related Art

In order to maximize the processing capability of a pipelined CPU (central processing unit; or processor), the instructions within a pipeline should ideally be kept flowing without any hindrance. To retain such an ideal state requires that the next instruction to be processed be prefetched from a memory location where it is held to the CPU or into an instruction cache. However, if the program includes a branch instruction, the address of the instruction to be executed next to the branch instruction is not definitively identified until after the branch instruction is carried out. For this reason, an instruction fetch is put on hold; a pipeline stall takes place; and the throughput of instruction execution drops. Thus many CPU's have arrangements for suppressing pipeline stalls by performing prefetches despite the uncertainties stemming from the branches.

The typical prefetch scheme that can be implemented by simple hardware is called next-line prefetch (e.g., see Japanese Patent No. 4327237 (FIG. 1)). This is a technique for prefetching instructions in the order in which they are programmed. The basic pattern of the processor fetching instructions from a memory involves accessing the memory in sequentially ascending order of addresses. Thus the prefetching by hardware constitutes an attempt at storing the instruction of a given address into a cache and, on the subsequent assumption that the next cache line will also be used, storing automatically the next cache line as well.

SUMMARY OF THE INVENTION

Although the above-described next-line prefetch can be implemented using a simple hardware structure, the fact that prefetches are performed by assuming no branches occurring results frequently in needless prefetches (known as prefetch misses). Having prefetch misses taking place involves the disadvantage of discarding the prefetched instruction and again fetching the instruction of the correct branch destination while getting the CPU to stay longer in its wait state. In addition, the need to read and write extra data entails increased memory access and further power dissipation. Furthermore, frequent and futile prefetches pose the problem of worsening traffic congestion on the data path.

Another attempt to diminish prefetch misses is the use of a technique called branch prediction. Whereas next-line prefetch involves prefetching the next line by predicting that it will never branch, branch prediction is characterized by having the branch direction predicted based on a past history and by prefetching the instruction from the predicted address. Branch prediction is complicated and requires the use of hardware containing extensive areas of circuitry including history tables. However, the performance benefits attained by branch prediction are dependent on the efficacy of prediction algorithms, many of which need to be implemented using storage apparatus of a relatively large capacity and complex hardware. When predictions fail, branch prediction also entails penalties similar to those brought about by next-line prefetch. The majority of actual programs have disproportionately high ratios of loops and exception handling in their branches, so that the advantages of branch prediction often outweigh its disadvantages. Still, some applications are structured in such a manner that it is difficult to raise their performance of prediction no matter what prediction algorithms may be utilized. In particular, codec applications tend to have their predictions missed except for those of loops. With the ratio of prediction hits naturally desired to be increased, the scheme for accomplishing that objective is getting bigger and more complicated in circuitry and may not lead to improvements in performance commensurate with the scale of the actual circuits.

As opposed to the above-outlined techniques for performing prefetches in one direction only, another type of technique has been proposed involving prefetching instructions in both directions of a branch without prediction to eliminate a prefetch miss. This technique is capable of dispensing with pipeline stalls by adding a limited amount of hardware compared with the technique of branch prediction. However, not only the amount of data to be stored for prefetches is simply doubled, but also needless data must always be read. The resulting congestion on the data path can adversely affect performance; added redundant circuits complicate circuit structures; and increased power dissipation is not negligible.

As outlined above, the existing prefetch techniques have their own advantages (expected boost in throughput) and disadvantages (increasing cost of implementing the CPU; overhead of branch prediction processing). There exist tradeoffs between cost and performance for each of these techniques.

The present invention has been made in view of the above circumstances and provides inventive arrangements for improving throughput by averaging the penalties involved in next-line prefetch for prefetching instruction.

In carrying out the present invention and according to one embodiment thereof, there is provided an instruction fetch apparatus, as well as a program counter addition control method representing the control function thereof, the instruction fetch apparatus including: a program counter configured to manage the address of an instruction targeted to be executed in a program in which instructions belonging to a plurality of instruction sequences are placed sequentially; a change designation register configured to designate a change of an increment value on the program counter; an increment value register configured to hold the changed increment value; and an addition control section configured such that if the change designation register designates the change of the increment value on the program counter, then the addition control section increments the program counter based on the changed increment value held in the increment value register, the addition control section further incrementing the program counter by an instruction word length if the change designation register does not designate any change of the increment value on the program counter. The instruction fetch apparatus and program counter addition control method above provide the effect of having the increment value on the program counter changed where a plurality of instruction sequences are arranged to coexist, in such a manner that a suitable instruction sequence is fetched.

Preferably, the change designation register may be decremented every time the program counter is incremented based on the changed increment value held in the increment value register, the change designation register further designating the change of the increment value on the program counter if the change designation register indicates a positive number. This structure provides the effect of having the increment value on the program counter changed in accordance with the length of the instruction sequence to be executed.

Preferably, the increment value register may hold the number of the instruction sequences as the changed increment value. This structure provides the effect of fetching each instruction sequence only.

Preferably, following the execution of a branch instruction branching in a predetermined number of directions, the increment value register may hold the predetermined number as the number of the instruction sequences. This structure provides the effect of fetching only the instruction sequence to which a branch is made.

According to another embodiment of the present invention, there is provided a processor including: a program counter configured to manage the address of an instruction targeted to be executed in a program in which instructions belonging to a plurality of instruction sequences are placed sequentially; a change designation register configured to designate a change of an increment value on the program counter; an increment value register configured to hold the changed increment value; an addition control section configured such that if the change designation register designates the change of the increment value on the program counter, then the addition control section increments the program counter based on the changed increment value held in the increment value register, the addition control section further incrementing the program counter by an instruction word length if the change designation register does not designate any change of the increment value on the program counter; and an instruction execution section configured to execute the instruction indicated by the program counter. This processor provides the effect of having the increment value on the program counter changed where a plurality of instruction sequences are arranged to coexist, in such a manner that a suitable instruction sequence is executed.

According to the present invention embodied as outlined above, it is possible to improve throughput by averaging the penalties involved in next-line prefetch for prefetching instructions.

BRIEF DESCRIPTION OF THE DRAWINGS

Further objects and advantages of the present invention will become apparent upon a reading of the following description and appended drawings in which:

FIG. 1 is a schematic view showing a typical pipeline structure of a processor constituting part of a first embodiment of the present invention;

FIG. 12 is a schematic view showing a variation of the field structure of the instruction header for the first embodiment;

FIG. 13 is a schematic view showing typical relations between the placement of a branch instruction and the start location of instruction prefetch in connection with a second embodiment of the present invention;

FIG. 15 is a schematic view showing a configuration example involving the use of an instruction prefetch timing field in an instruction header for the second embodiment;

FIGS. 24A, 24B, 24C and 24D are schematic views showing a typical instruction set for setting values to the addition control register for the third embodiment;

FIG. 25 is a schematic view showing how values are set to the addition control register by a conditional branch instruction for the third embodiment;

FIG. 26 is a schematic view showing how values are set to the addition control register by a control register change instruction for the third embodiment;

FIG. 27 is a flowchart showing a typical procedure by which the third embodiment executes instructions;

FIG. 32 is a schematic view showing a typical functional structure by which the fourth embodiment places instructions;

FIG. 33 is a flowchart showing a typical procedure by which the fourth embodiment places instructions;

FIGS. 34A and 34B are schematic views showing how a prefetch address register is typically set by the fourth embodiment;

FIG. 36 is a flowchart showing a typical procedure by which the fourth embodiment executes instructions.

DETAILED DESCRIPTION OF THE PREFERRED EMBODIMENTS

Figure 2:
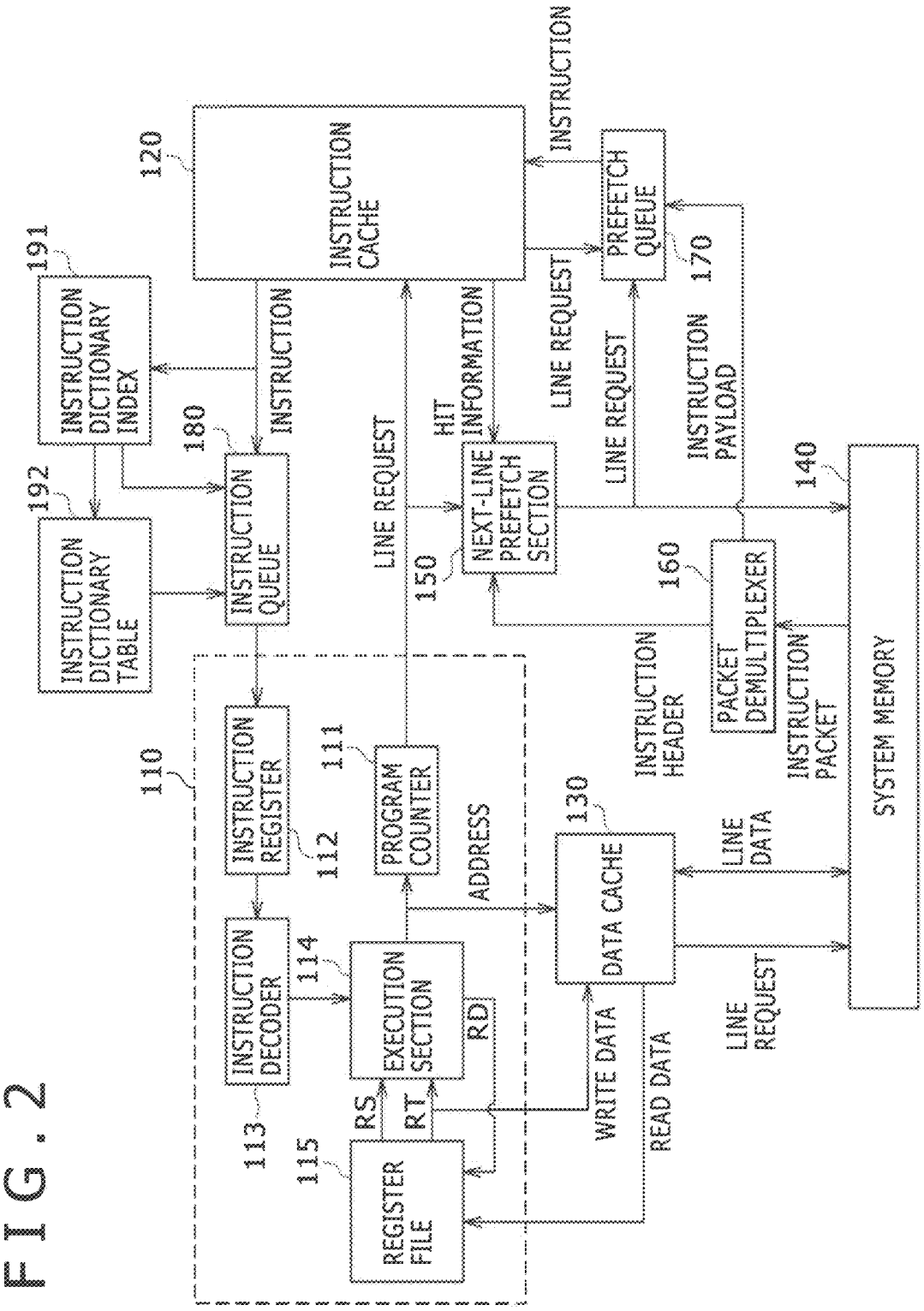
FIG. 2 is a schematic view showing a typical block structure of the processor constituting part of the first embodiment.

The preferred embodiments of the present invention will now be described below. The description will be given under the following headings:

1. First embodiment (for controlling the inhibition of instruction prefetch using branch prediction information)
2. Second embodiment (for controlling the timing of instruction prefetch)
3. Third embodiment (for averaging the penalties of instruction prefetch by placing instructions in mixed fashion)
4. Fourth embodiment (for averting cache line collision by fixing the placement of branch destination cache line)
5. Combinations of the embodiments 1. First Embodiment

[Structure of the Processor]

FIG. 1 is a schematic view showing a typical pipeline structure of a processor constituting part of the first embodiment of the present invention. This example presupposes five pipeline stages: an instruction fetch stage (IF) 11, an instruction decode stage (ID) 21, a register fetch stage (RF) 31, an execution stage (EX) 41, and a memory access stage (MEM) 51. The pipelines are delimited by latches 19, 29, 39, and 49. Pipeline processing is carried out in synchronization with a clock.

The instruction fetch stage (IF) 11 involves performing instruction fetch processing. At the instruction fetch stage 11, a program counter (PC) 18 is sequentially incremented by an addition section 12. The instruction pointed to by the program counter 18 is sent downstream to the instruction decode stage 21. Also, the instruction fetch stage 11 includes an instruction cache (to be discussed later) to which an instruction is prefetched. A next-line prefetch section 13 is used to prefetch the next line, i.e., the cache line next to the cache line containing the instruction currently targeted to be executed.

The instruction decode stage (ID) 21 involves decoding the instruction supplied from the instruction fetch stage 11. The result of the decoding done at the instruction decode stage 21 is forwarded to the register fetch stage (RF) 31. In the case of a branch instruction, the branch destination address of the instruction is fed to the program counter (PC) 18.

The register fetch stage (RF) 31 involves fetching the operands necessary for instruction execution. With many pipeline processors, the target for operand access is limited to register files. The operand data acquired at the register fetch stage 31 is supplied to the execution stage (EX) 41.

The execution stage (EX) 41 involves executing instructions using operand data. For example, arithmetic and logic operations as well as branch determination operations are carried out. The execution result data acquired at the execution stage (EX) 41 is stored into a register file. In the case of a store instruction, a write operation is performed on a memory at the memory access stage (MEM) 51.

The memory access stage (MEM) 51 involves gaining access to the memory. In the case of a load instruction, a read access operation is performed on the memory; in the case of a store instruction, a write access operation is carried out on the memory.

FIG. 2 is a schematic view showing a typical block structure of the processor constituting part of the first embodiment. This processor includes a processor core 110, an instruction cache 120, a data cache 130, a next-line prefetch section 150, and a packet demultiplexer 160. The processor further contains a prefetch queue 170, an instruction queue 180, an instruction dictionary index 191, and an instruction dictionary table 192. Also, the processor is connected to a system memory 140.

The processor core 110 contains the major facilities of the processor except for the instruction fetch facility, and is made up of a program counter 111, an instruction register 112, an instruction decoder 113, an execution section 114, and a register file 115. The program counter 111 sequentially counts up the address of the instruction targeted to be executed. The instruction register 112 holds the instruction targeted for execution by the program counter 111. The instruction decoder 113 decodes the instruction held by the instruction register 112. The execution section 114 executes the instruction decoded by the instruction decoder 113. The register file 115 provides a storage area that holds operands and other data necessary for the execution of the instruction by the execution section 114.

The instruction cache 120 is a cache memory that holds a copy of the instruction stored in the system memory 140. Upon access to an instruction by the processor core 110, the instruction cache 120 permits the processor core 110 more rapid access to the instruction in question than the system memory 140. For this reason, it is preferable to hold the instruction beforehand in the instruction cache 120 as much as possible. If the necessary instruction is found to be held in the instruction cache 120 upon access thereto, the access is called a hit; if the necessary instruction is not found to be cached, the access is called a miss hit.

The data cache 130 is a cache memory that holds a copy of the data stored in the system memory 140. Upon access to data by the processor core 110, the data cache 130 permits the processor core 110 more rapid access to the data than the system memory 140. For this reason, it is preferable to hold the data beforehand in the instruction cache 120 as much as possible. As with the instruction cache 120, if the necessary data is found to be held in the data cache 130 upon access thereto, the access is called a hit; if the necessary data is not found to be cached, the access is called a miss hit. Unlike with the instruction cache 120, the data cache 130 is used for write access operations as well.

The next-line prefetch section 150 is used to prefetch the next line, i.e., the next cache line as the instruction predicted to be needed, from the system memory 140 into the instruction cache 120. The next-line prefetch section 150 corresponds to the next-line prefetch section 13 of the pipeline structure, and belongs to the instruction fetch stage (IF) 11. The next-line prefetch section 150 monitors the status of the program counter 111 and, in a suitably timed manner, issues a prefetch request to the system memory 140 for prefetching the cache line of the instruction cache 120 from the instruction cache 120.

The packet demultiplexer 160 divides the instruction packet retrieved from the system memory 140 into an instruction header and an instruction payload. The structure of the instruction packet will be discussed later. The cache line of a given instruction is contained in its instruction payload.

The prefetch queue 170 is a queue that holds the cache lines of instructions contained in their instruction payloads. The cache lines held in the prefetch queue 170 are put sequentially into the instruction cache 120 starting from the first cache line.

The instruction queue 180 is a queue that holds the cache lines of the instructions retrieved from the instruction cache 120 in accordance with the program counter 111.

The instruction dictionary index 191 and instruction dictionary table 192 are used to implement a compression instruction based on reference to an instruction dictionary table. When a macro composed of a series of instructions designed to appear with high frequency first appears, that instruction macro is registered using an instruction dictionary registration instruction. When the macro appears the next time, it is replaced by a single instruction with regard to the instruction dictionary reference instruction. The instruction dictionary table 192 holds macros each made up of a series of instructions. The instruction dictionary index 191 functions as an index by which to access the instruction dictionary table 192. How to use the compression instruction based on reference to the instruction dictionary table will be discussed later.

The system memory 140 stores the instruction targeted to be executed as well as the data necessary for executing the instruction in question. The processor core 110 requests a read or a write access operation on the system memory 140. However, this request does not take place as long as there are hits in the instruction cache 120 or in the data cache 130. Incidentally, the system memory 140 is an example of the instruction packet holding section described in the appended claims.

In the block structure example above, the program counter 111, instruction cache 120, next-line prefetch section 150, packet demultiplexer 160, prefetch queue 170, and instruction queue 180 belong to the instruction fetch stage (IF) 11 shown in FIG. 1. Also, the instruction register 112, instruction dictionary index 191, and instruction dictionary table 192 may be regarded as constitute part of the instruction fetch stage (IF) 11. Likewise, the instruction decoder 113 belongs to the instruction decode stage (ID) 21. And the register file 115 belongs to the register fetch stage (RF) 31. The execution section 114 belongs to the execution stage (EX) 41. The data cache 130 and system memory 140 belong to the memory access stage (MEM) 51.

[Structure of the Instruction Packet]

Figure 3:
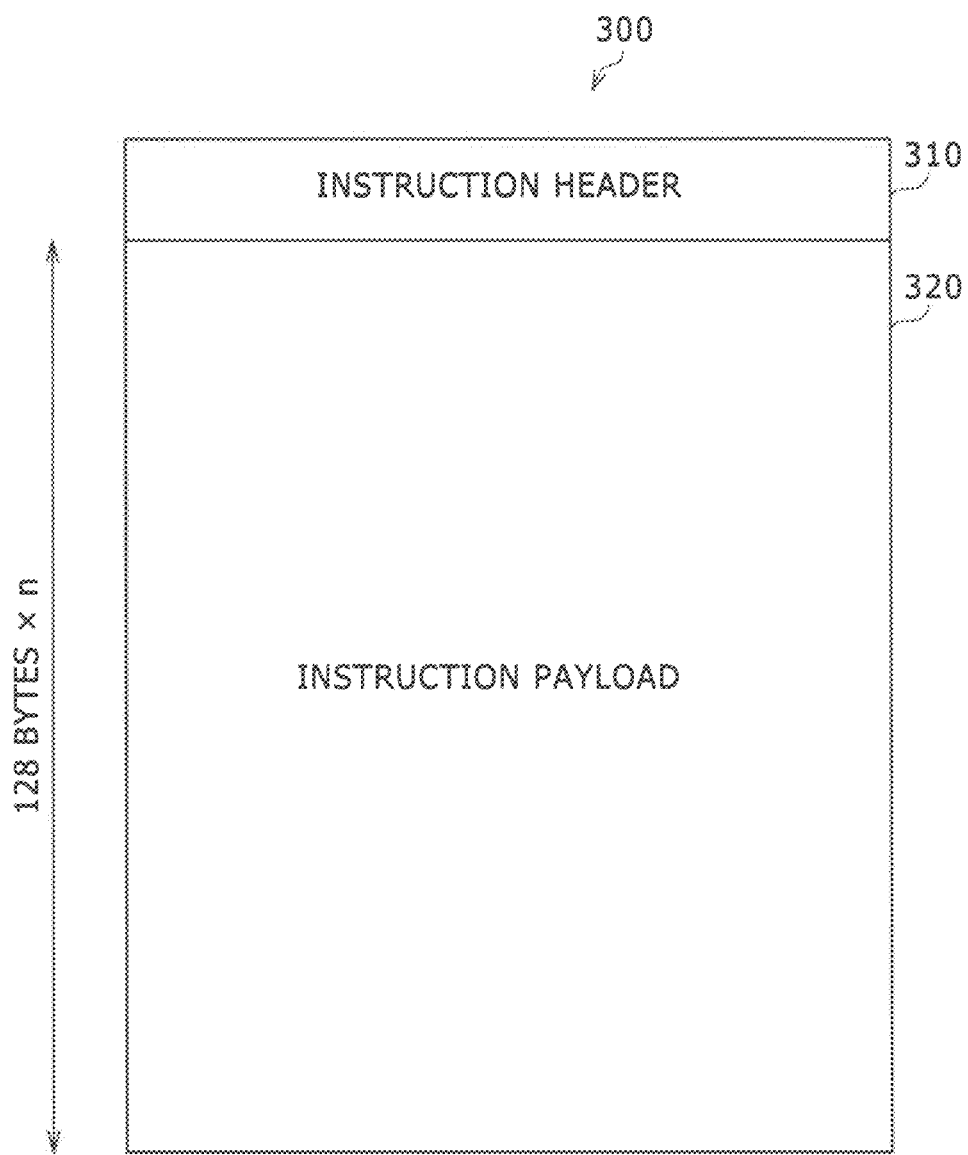
FIG. 3 is a schematic view showing a typical instruction packet structure for the first embodiment.

FIG. 3 is a schematic view showing a typical structure of an instruction packet 300 for the first embodiment. The instruction packet 300 is made up of an instruction header 310 and an instruction payload 320. The instruction payload 320 is an area that accommodates at least one instruction cache line. In this example, it is assumed that as many as "n" (n is an integer of at least 1) instruction cache lines of 128 bytes each are kept in the instruction payload 320. The instruction header 310 is attached to each instruction payload 320 and retains information about the instruction payload 320.

Figure 4:
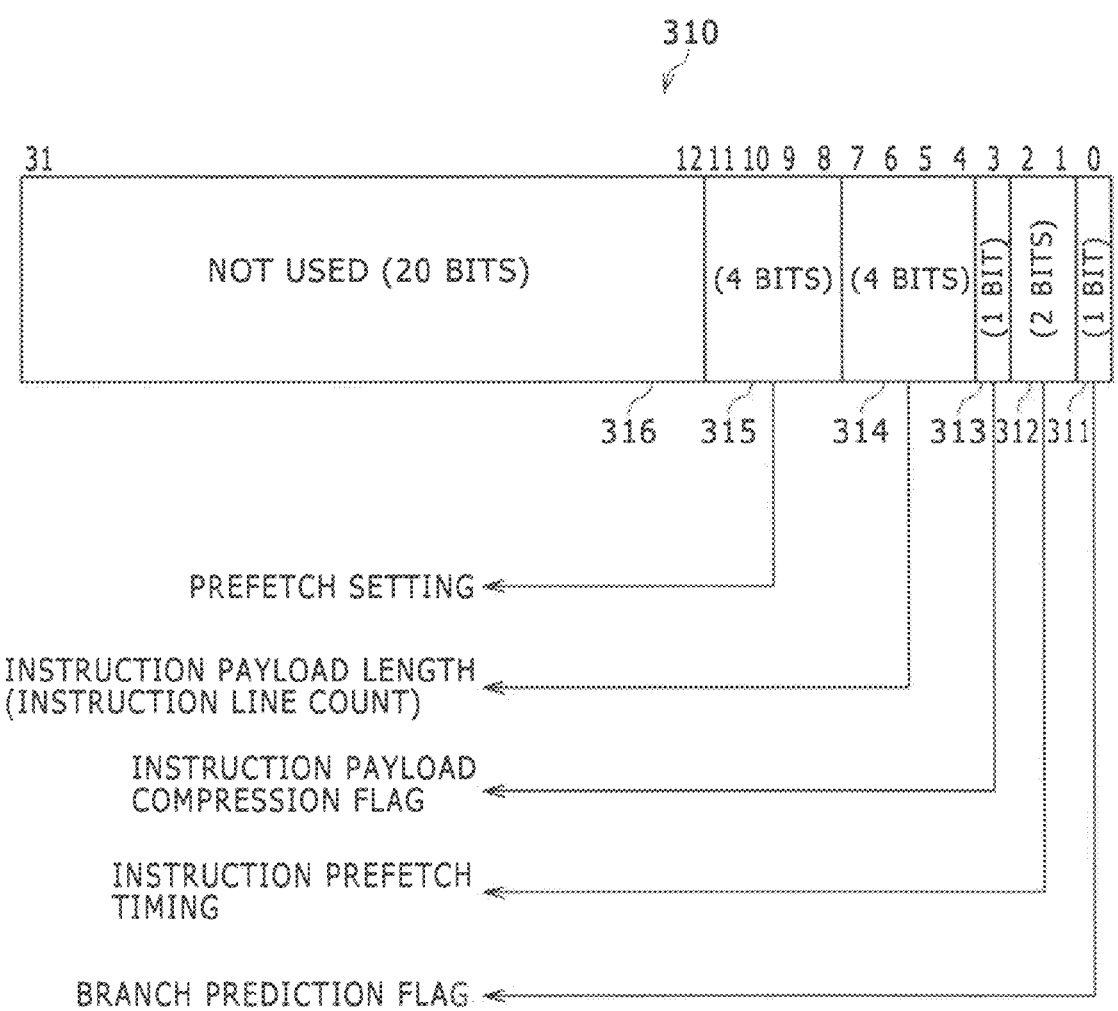
FIG. 4 is a schematic view showing a typical field structure of an instruction header for the first embodiment.

FIG. 4 is a schematic view showing a typical field structure of the instruction header 310 for the first embodiment. A first structure example of the instruction header 310 includes a branch prediction flag field 311, an instruction prefetch timing field 312, an instruction payload compression flag field 313, an instruction payload length field 314, and a prefetch setting field 315. With this example, the instruction header 310 is assumed to be 32 bits long. Starting from the least significant bit (LSB), the branch prediction flag 311 is assigned to bit 0, followed by the instruction prefetch timing 312 to bits 1 and 2, and instruction payload compression flag 313 to bit 3. Also, the instruction payload length 314 is assigned to bits 4 through 7 and the prefetch setting 315 to bits 8 through 11. A 20-bit unused field 316 formed by the remaining bits 12 through 31 may be used for other purposes, as will be discussed later.

The branch prediction flag 311 is a field indicating that there exists a branch instruction in the instruction payload 320 and that the instruction is highly likely to branch neither within the instruction payload 320 nor to the next instruction payload. That is, the branch prediction flag 311 may typically indicate "1" if the next line is highly likely to be found unwanted upon prefetch; otherwise the branch prediction flag 311 may indicate "0." Incidentally, the branch prediction flag 311 is an example of the branch prediction information described in the appended claims.

The instruction prefetch timing 312 is a field that indicates the timing for executing instruction prefetch. The instruction prefetch timing 312 will be discussed in connection with the second embodiment, to be described later. Incidentally, the instruction prefetch timing 312 is an example of the prefetch timing information described in the appended claims.

The instruction payload compression flag 313 is a field indicating whether the instruction payload 320 underwent lossless compression. Lossless compression refers to a type of reversible compression that entails no data losses. Having undergone lossless compression, the instruction payload 320 has its entire bit sequences compressed. Falling under the category of lossless compression are Huffman code, arithmetic code, and LZ code, which are well known among others. If the instruction payload 320 is found to have undergone lossless compression, it needs to be expanded; otherwise the instructions of the instruction payload 32 cannot be executed. Thus if the instruction payload compression flag 313 indicates "1," then the instructions are expanded before being decoded. The benefit of getting one instruction cache line to undergo lossless compression is negligible because the amount of the data to be fetched is not reduced. Coding efficiency is increased only if the bit sequences involved are relatively long. If a branch instruction is included, the instruction packet needs to be divided into basic blocks.

The instruction payload length 314 is a field that indicates the size of the instruction payload 320. For example, the size of the instruction payload 320 may be indicated in increments of an instruction cache line count. The foregoing example presupposes that as many as "n" 128-byte instruction cache lines are stored in the instruction payload 320. In this case, the value "n" is set to the instruction payload length 314.

The prefetch setting 315 is a field in which to preset the address targeted for prefetch. The prefetch setting 315 will be discussed in connection with the fourth embodiment, to be described later.

[Branch Prediction Flag]

Figure 5:
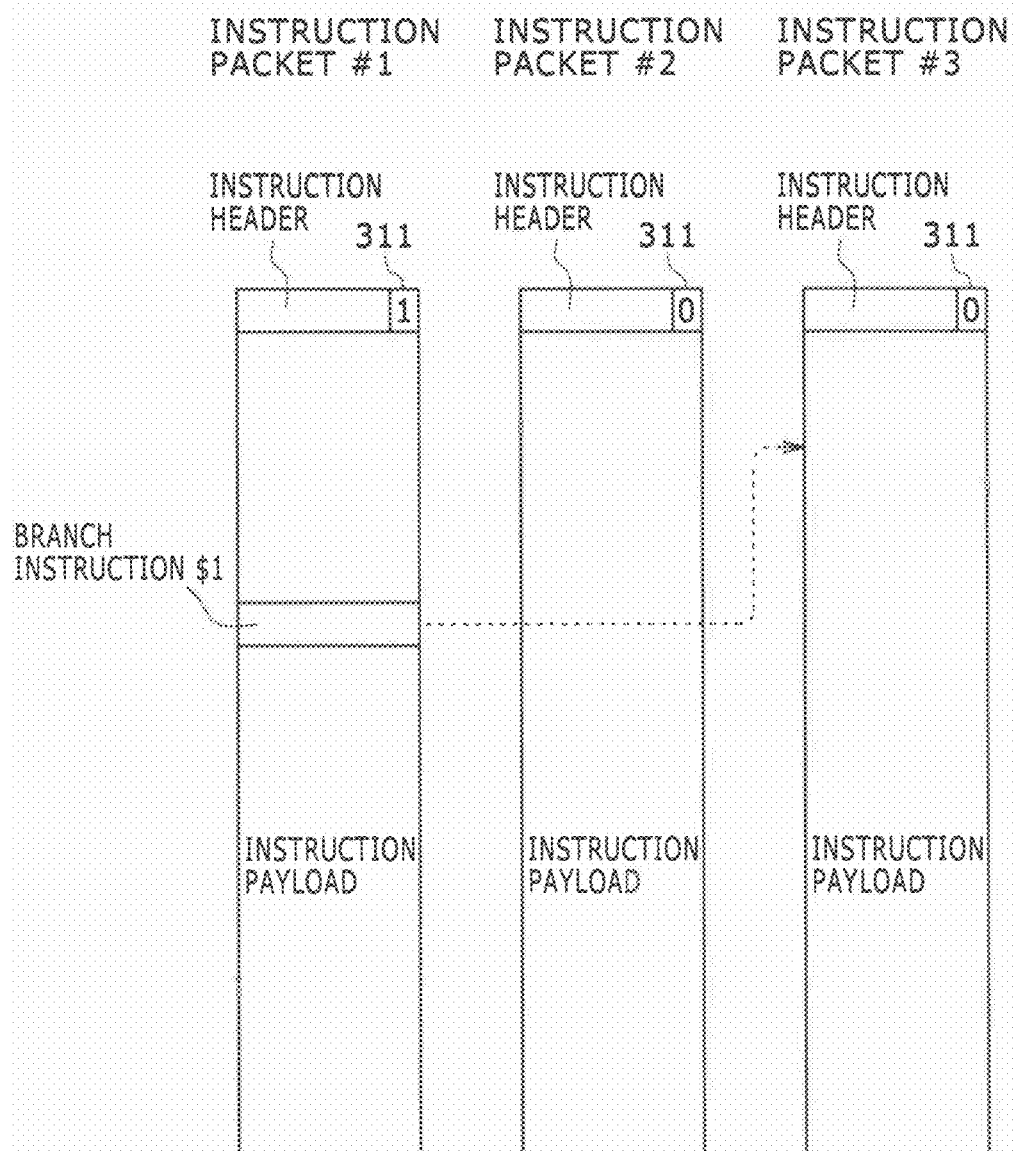
FIG. 5 is a schematic view showing typical settings of a branch prediction flag for the first embodiment.

FIG. 5 is a schematic view showing typical settings of the branch prediction flag 311 for the first embodiment. This example presupposes that a branch instruction $1 is included in the instruction payload of an instruction packet #1 and that no branch instruction is included in instruction packets #2 and #3. The branch destination of the branch instruction $1 is an instruction address within the instruction payload of the instruction packet #3, and the probability of branching to that address is predicted to be high. Thus in this case, the branch prediction flag 311 in the instruction header of the instruction packet #1 is set to "1." On the other hand, the branch prediction flag 311 in the instruction headers of the instruction packets #2 and #3 is set to "0" because no branch instruction is included in the instruction packets #2 and #3. As will be discussed later, the branch prediction flag 311 is assumed to be set statically at compile time based typically on a profile. When viewed from the instruction packet #1, the next line is found in the instruction packet #2 and the branch destination line is found in the instruction packet #3.

The branch prediction flag 311 set as explained above is referenced upon instruction prefetch. When set to "1," the branch prediction flag 311 stops the prefetch of the next cache line. This averts the instruction prefetch predicted to be unwanted.

Meanwhile, if there continuously occur cases in which the branch prediction flag 311 is set to "1," the suppression of instruction prefetch may keep the instruction prefetch facility from being effectively utilized. In order to avoid such continuous cases where the branch prediction flag 311 is set to "1," it may be profitable to consider compressing the instructions between branch instructions through compression processing based on reference to the instruction dictionary table. This type of compression based on reference to the instruction dictionary table is different from lossless compression regarding the instruction payload compression flag 313.

[Compression Based on Reference to the Instruction Dictionary Table]

Figure 6:
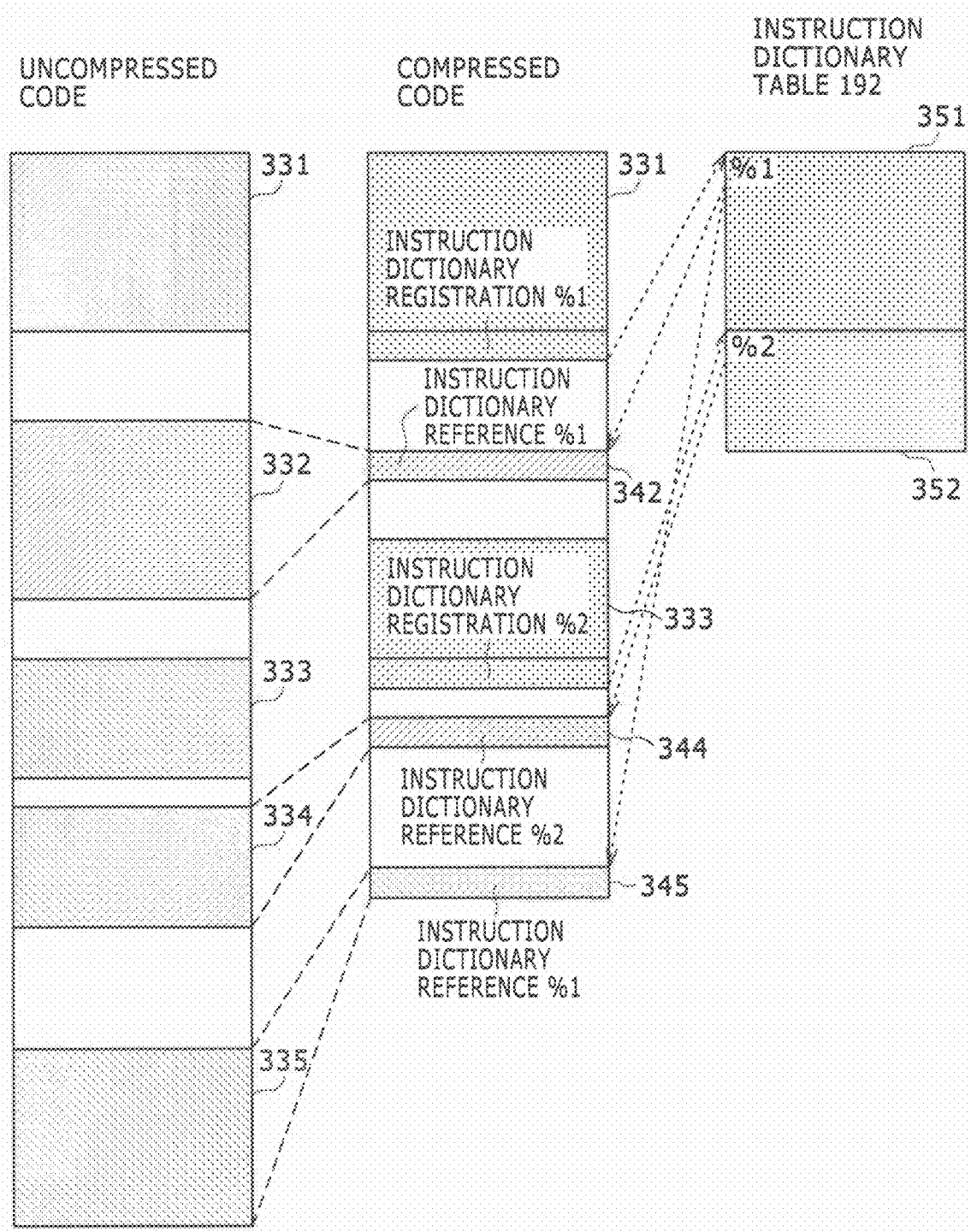
FIG. 6 is a schematic view showing how the compression based on reference to an instruction dictionary table is typically applied to the first embodiment.

FIG. 6 is a schematic view showing how the compression based on reference to the instruction dictionary table is typically applied to the first embodiment. The uncompressed code on the left side in FIG. 6 shows uncompressed instruction sequences 331 through 335 being placed as indicated. It is assumed here that the instruction sequences 331, 332 and 335 are the same code. It is also assumed that the instruction sequences 333 and 334 are the same code.

In the compressed code in the middle of FIG. 6, an instruction dictionary registration instruction %1 is placed immediately following the instruction sequence 331. This placement causes the content of the instruction sequence 331 to be registered in an area %1 (351) of the instruction dictionary table 192. Subsequently, when the instruction dictionary reference instruction %1 (342) is executed, the area of (351) of the instruction dictionary table 192 is referenced, and the content corresponding to the instruction sequence 332 is expanded before being fed to the instruction queue 180.

Also in the compressed code, an instruction dictionary registration instruction %2 is placed immediately following the instruction sequence 333. This placement causes the content of the instruction sequence 333 to be registered in an area %2 (352) of the instruction dictionary table 192. Subsequently, when the instruction dictionary reference instruction %2 (344) is executed, the area %2 (352) of the instruction dictionary table 192 is referenced, and the content corresponding to the instruction sequence 334 is expanded before being fed to the instruction queue 180.

Furthermore, when the instruction dictionary reference instruction %1 (345) is executed, the area %1 (351) of the instruction dictionary table 192 is referenced, and the content corresponding to the instruction sequence 335 is expanded before being fed to the instruction queue 180.

As described, having recourse to the instruction dictionary table 192 implements the compression processing of instruction sequences. This feature may be used to change the settings of the branch prediction flag 311 as described below.

Figure 7:
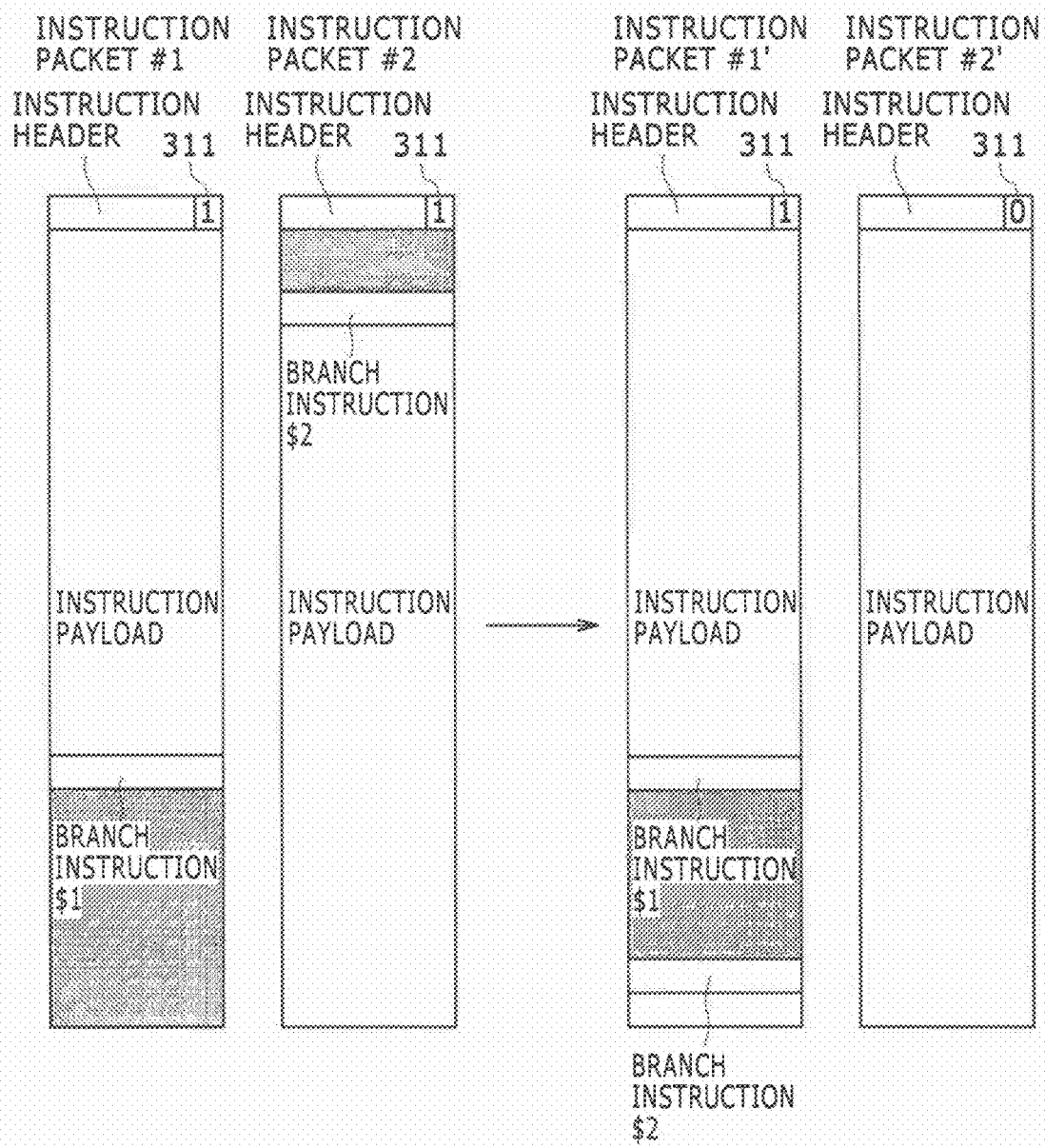
FIG. 7 is a schematic view showing how the branch prediction flag for compression based on reference to the instruction dictionary table is typically changed with the first embodiment.

FIG. 7 is a schematic view showing how the branch prediction flag 311 for compression based on reference to the instruction dictionary table is typically changed with the first embodiment. Where the branch prediction flag 311 is set to "1" in instruction packets #1 and #2 as shown on the left side in FIG. 7, instruction prefetch will not be carried out continuously. In this case, an attempt may be made to prevent the branch prediction flag 311 from getting set to "1" continuously, through instruction compression by use of the above-mentioned instruction dictionary table 192.

That is, as shown on the right side in FIG. 7, the instructions between branch instructions $1 and $2 are compressed using the instruction dictionary table 192, whereby the branch instruction $2 included in the instruction packet #2 is moved into an instruction packet #1'. With the branch instruction $2 thus removed from the instruction packet #2, the branch prediction flag 311 of an instruction packet #2' can be set to "0."

Generally, the compression instruction based on reference to an instruction dictionary table may need a larger number of cycles for decoding than ordinary instructions. It follows that applying this type of compression instruction to all instructions may well worsen processing capability contrary to the expectations. Still, this arrangement effectively provides high compression efficiency in the cases where there exist instruction macros characterized by their high frequency of appearance.

[Instruction Packet Generation Process]

Figure 8:
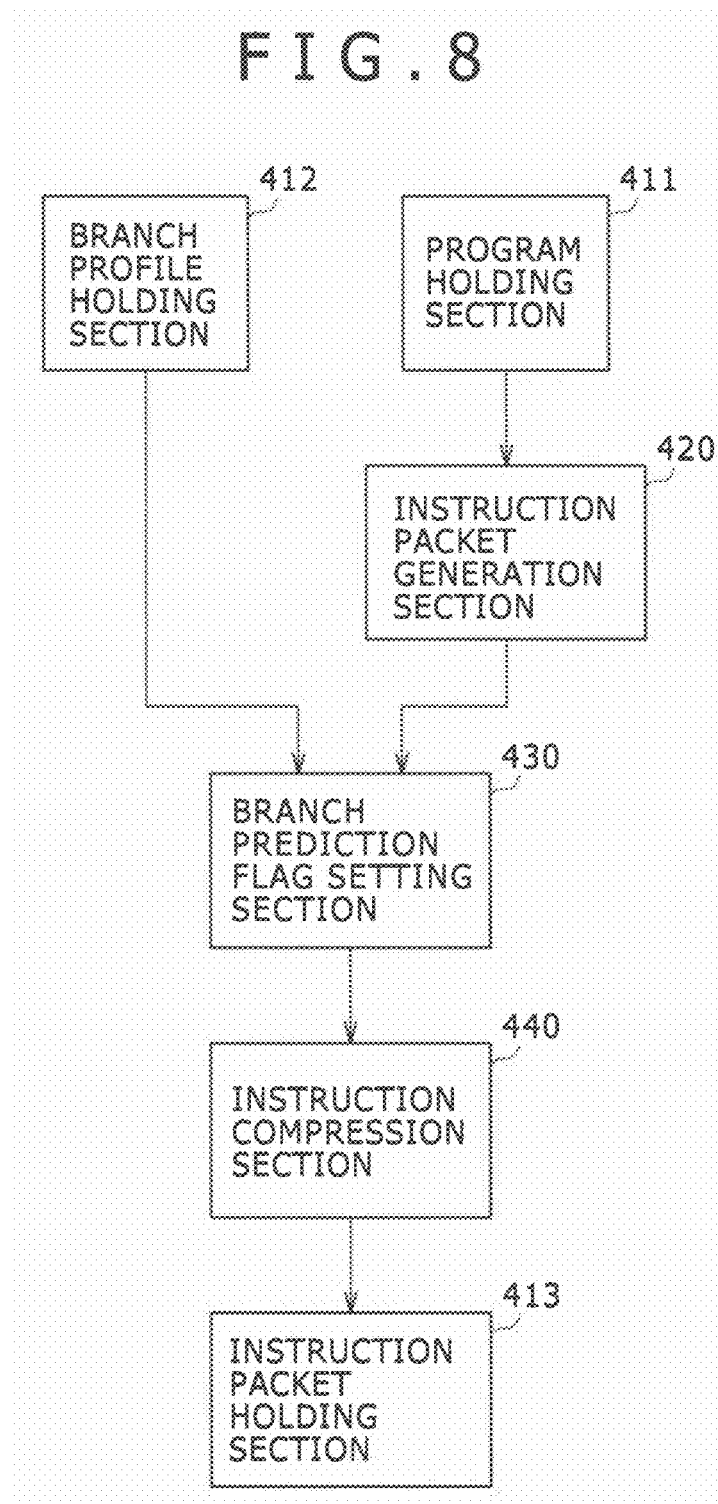
FIG. 8 is a schematic view showing a typical functional structure by which the first embodiment generates instruction packets.

FIG. 8 is a schematic view showing a typical functional structure by which the first embodiment generates instruction packets. This example includes a program holding section 411, a branch profile holding section 412, an instruction packet generation section 420, a branch prediction flag setting section 430, an instruction compression section 440, and an instruction packet holding section 413. It is preferred to generate instruction packets at compile time or at link time. It is also possible to generate instruction packets at execution time if dynamic link is performed under a relocatable OS.

The program holding section 411 holds the program of which the instruction packets are to be generated. The branch profile holding section 412 holds a branch profile of the branch instructions included in the program held by the program holding section 411. The branch profile is obtained by analyzing or executing the program beforehand. In the case of an unconditional branch instruction, whether or not to perform the branch can be determined in many cases by analyzing the program. Even with the unconditional branch instruction, a statistical probability of the branch can be determined by executing the program.

The instruction packet generation section 420 generates an instruction packet 300 by dividing the program held in the program holding section 411 into fixed sizes to generate an instruction payload 320 and by attaching an instruction header 310 to the generated instruction payload 320. As mentioned above, it is assumed that as many as "n" 128-byte instruction cache lines are stored in the instruction payload 320.

The branch prediction flag setting section 430 sets the branch prediction flag 311 in the instruction header 310 generated by the instruction packet generation section 420. By referencing the branch profile held in the branch profile holding section 412, the branch prediction flag setting section 430 predicts the branch destination of the branch instruction included in the instruction payload 320 as well as a branch probability of that branch instruction in order to set the branch prediction flag 311. If there is found a branch instruction in the instruction payload 320 and if the instruction is highly likely to branch neither within the instruction payload 320 nor to the next instruction payload, then "1" is set to the branch prediction flag 311; otherwise "0" is set to the branch prediction flag 311. Incidentally, the branch prediction flag setting section 430 is an example of the branch prediction information setting section described in the appended claims.

The instruction compression section 440 compresses the instructions included in the instruction payload 320. In order to compress the instructions using the instruction dictionary table 192, the instruction compression section 440 detects instruction macros with high frequency of appearance. When such an instruction macro is first detected to appear, that instruction macro is registered using an instruction dictionary registration instruction. When that macro composed of a series of instructions appears the next time, it is replaced by a single instruction with regard to the instruction dictionary reference instruction. As a result, if the placement of a branch instruction is changed, the branch prediction flag 311 is set again. If the entire instruction payload 320 is found to have undergone lossless compression, then the instruction payload compression flag 313 in the instruction header 310 is set to "1."

The instruction packet holding section 413 holds the instruction packet 300 output from the instruction compression section 440.

Figure 9:
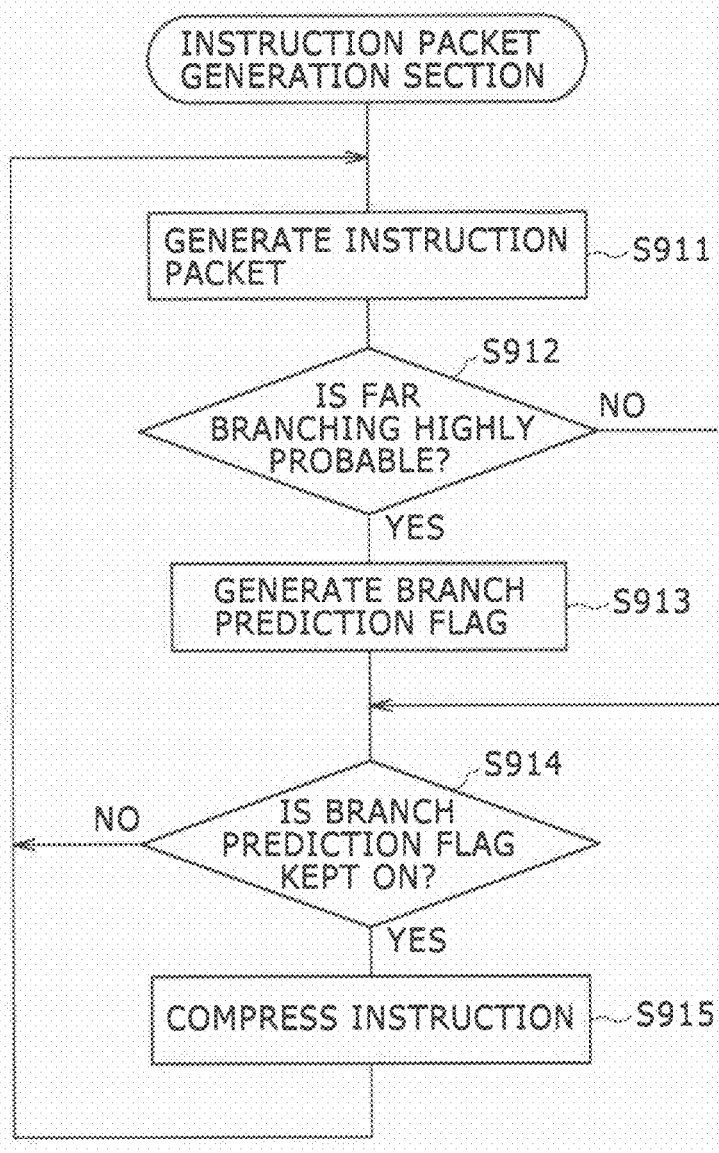
FIG. 9 is a flowchart showing a typical procedure by which the first embodiment generates instruction packets.

FIG. 9 is a flowchart showing a typical procedure by which the first embodiment generates instruction packets.

First, the instruction packet generation section 420 generates an instruction packet 300 by dividing the program held in the program holding section 411 into fixed sizes to generate an instruction payload 320 and by attaching an instruction header 310 to the generated instruction payload 320 (in step S911). Then the branch prediction flag setting section 430 determines if there is found a branch instruction in the instruction payload 320 and if the instruction is highly likely to branch neither within the instruction payload 320 nor to the next instruction payload (in step S912). If it is determined to be highly probable that such a branch will take place, then "1" is set to the branch prediction flag 311 (in step S913). Otherwise, "0" is set to the branch prediction flag 311.

If it is determined that "1" is set in the branch prediction flag 311 of the continued instruction packet 300 (in step S914), the instruction compression section 440 compresses the instructions within the instruction payload 320 using the instruction dictionary table 192 (in step S915). It is also possible to subject the entire instruction payload 320 to lossless compression. In this case, the instruction payload compression flag 313 of the instruction header 310 is set to "1."

[Instruction Execution Process]

Figure 10:
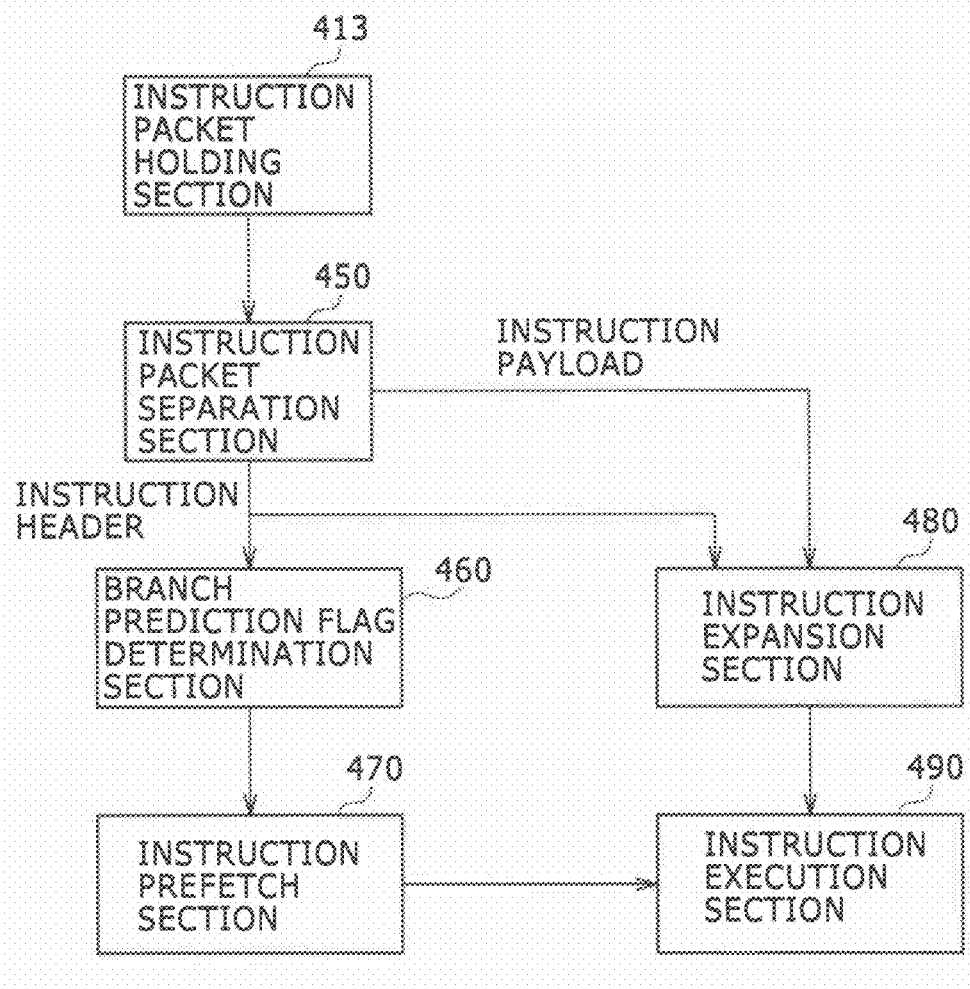
FIG. 10 is a schematic view showing a typical functional structure by which the first embodiment executes instructions.

FIG. 10 is a schematic view showing a typical functional structure by which the first embodiment executes instructions. This example includes an instruction packet holding section 413, an instruction packet separation section 450, a branch prediction flag determination section 460, an instruction prefetch section 470, an instruction expansion section 480, and an instruction execution section 490.

The instruction packet separation section 450 separates the instruction packet 300 held in the instruction packet holding section 413 into the instruction header 310 and instruction payload 320.

The branch prediction flag determination section 460 references the branch prediction flag 311 in the instruction header 310 to determine whether or not to prefetch the next cache line through the instruction cache 120. If it is determined that the prefetch should be performed, the branch prediction flag determination section 460 requests the instruction prefetch section 470 to carry out an instruction prefetch. Incidentally, the branch prediction flag determination section 460 is an example of the branch prediction information determination section described in the appended claims.

When requested to perform an instruction prefetch by the branch prediction flag determination section 460, the instruction prefetch section 470 issues a request to the system memory 140 for the next cache line. The prefetched instruction is held in the instruction cache 120 and then supplied to the instruction execution section 490 if there is no change taking place in the instruction flow.

If the instruction payload compression flag 313 in the instruction header 310 is found set to "1," the instruction expansion section 480 expands the instruction payload 320 having undergone lossless compression into a decodable instruction sequence. If the instruction payload compression flag 313 in the instruction header 310 is not found set to "1," then the instruction expansion section 480 outputs the instructions in the instruction payload 320 without change.

The instruction execution section 490 executes the instruction sequence output from the instruction expansion section 480. Given an instruction sequence having undergone compression based on reference to the instruction dictionary table, the instruction execution section 490 expands the instructions by executing the instruction dictionary registration instruction and instruction dictionary reference instruction. Meanwhile, in the case of lossless compression, the instruction sequence cannot be decoded as is; it needs to be expanded by the instruction expansion section 480.

Figure 11:
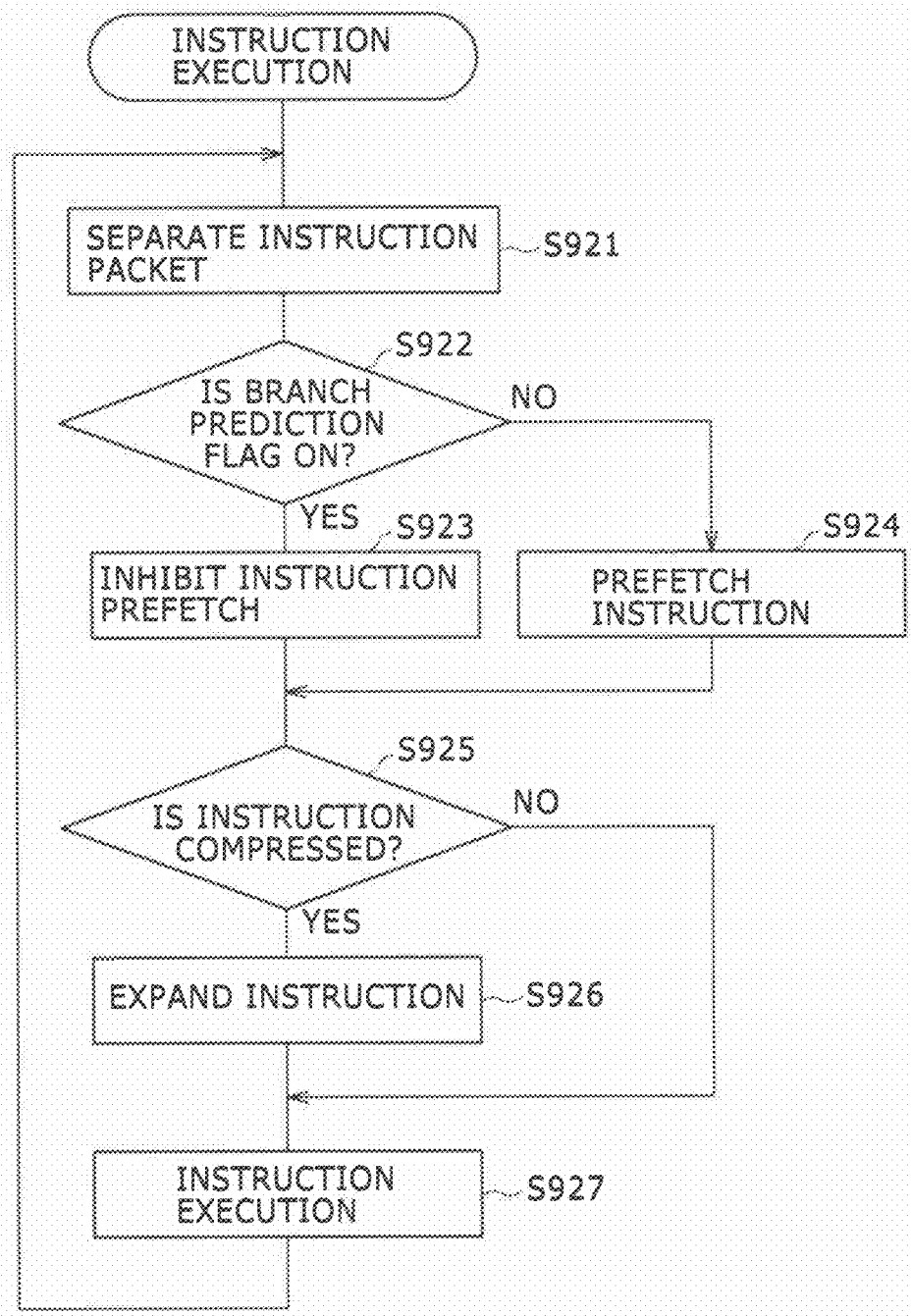
FIG. 11 is a flowchart showing a typical procedure by which the first embodiment executes instructions.

FIG. 11 is a flowchart showing a typical procedure by which the first embodiment executes instructions.

First, the instruction packet 300 held in the instruction packet holding section 413 is separated by the instruction packet separation section 450 into the instruction header 310 and the instruction payload 320 (in step S921). Then the branch prediction flag 311 in the instruction header 310 is determined by the branch prediction flag determination section 460 (in step S922). If it is determined that "1" is set to the branch prediction flag 311, an instruction prefetch is inhibited (in step S923). If "0" is determined to be set, then the instruction prefetch section 470 performs the instruction prefetch (in step S924).

If it is determined that the instruction payload compression flag 313 in the instruction header 310 is set to "1" (in step S925), the instruction expansion section 480 expands the instruction payload 320 having undergone lossless compression (in step S926).

The instruction thus obtained is executed by the instruction execution section 490 (in step S927). In the case of an instruction sequence having undergone compression based on reference to the instruction dictionary table, the instruction execution section 490 expands each of the instructions by executing the instruction dictionary registration instruction and instruction dictionary reference instruction.

Incidentally, step S921 is an example of the step of separating an instruction packet described in the appended claims. Step S922 is an example of the step of determining branch prediction information described in the appended claims. Steps S923 and S924 are an example of the steps of prefetching an instruction described in the appended claims.

According to the first embodiment of the present invention, as described above, it is possible to inhibit needless instruction prefetches by suitably setting the branch prediction flag 311 beforehand.

[Variation]

FIG. 12 is a schematic view showing a variation of the field structure of the instruction header 310 for the first embodiment. In the example of the field structure in FIG. 4, the 20-bit area of bits 12 through 31 was shown as the unused area 316, whereas the variation of FIG. 12 involves having the start instruction of the instruction payload held in a 20-bit area 317. Although the first embodiment presupposes the instruction set of 32 bits long, the start instruction may be compacted to 20 bits through arrangements such as removal of an unused portion from the instruction field and reductions of operands. The 20-bit instruction is then embedded in the area 317. Because the start instruction is embedded in the area 317, the size of the instruction payload 320 is reduced by one instruction, i.e., by 32 bits.

In the above example, the start instruction was shown to be compacted to 20 bits. However, the bit width of the compacted instruction is not limited to 20 bits. The bit width may be determined appropriately in relation to the other fields.

2. Second Embodiment

The above-described first embodiment presupposed that programs are managed using instruction packets. However, this type of management is not mandatory for the second embodiment of the present invention. Explained first below will be instruction prefetch control without recourse to instruction packets, followed by an explanation of instruction prefetch using instruction packets. The pipeline structure and block structure of the second embodiment are the same as those of the first embodiment and thus will not be discussed further.

[Branch Instruction Placement and Instruction Prefetch Start Locations]

FIG. 13 is a schematic view showing typical relations between the placement of a branch instruction and the start location of instruction prefetch in connection with the second embodiment of the present invention. The branch destination of a branch instruction $1 found in a cache line #1 is included in a cache line #3. Thus if the branch instruction $1 is executed and the branch is carried out accordingly, a cache line #2 next to the cache line #1 will be wasted even if prefetched.

Suppose now that the prefetch of the cache line #2 is started from a prefetch start location A. At this point, the result of executing the branch instruction $1 is unknown, so that the prefetch of the cache line #2 may turn out to be unnecessary. On the other hand, if the prefetch of the cache line #2 is started from a prefetch start location B, the result of the execution of the branch instruction $1 is already known, so that the needless prefetch of the cache line #2 can be inhibited.

As described, the prefetch start location can affect the determination of whether or not the next-line prefetch is effectively inhibited. According to the example given above, the later the prefetch start location, the easier it is to know the result of the execution of the branch instruction, which is more advantageous to inhibiting a needless prefetch. On the other hand, if the prefetch start location is too late, then the prefetch cannot be performed in time, which can lead to an instruction wait state in the instruction pipeline. In view of these considerations, the second embodiment is furnished with the facility to perform instruction prefetches in a suitably timed manner that is established beforehand.

[Where Timing is Set to the Prefetch Start Address Setting Register]

Figures 14A, 14B:
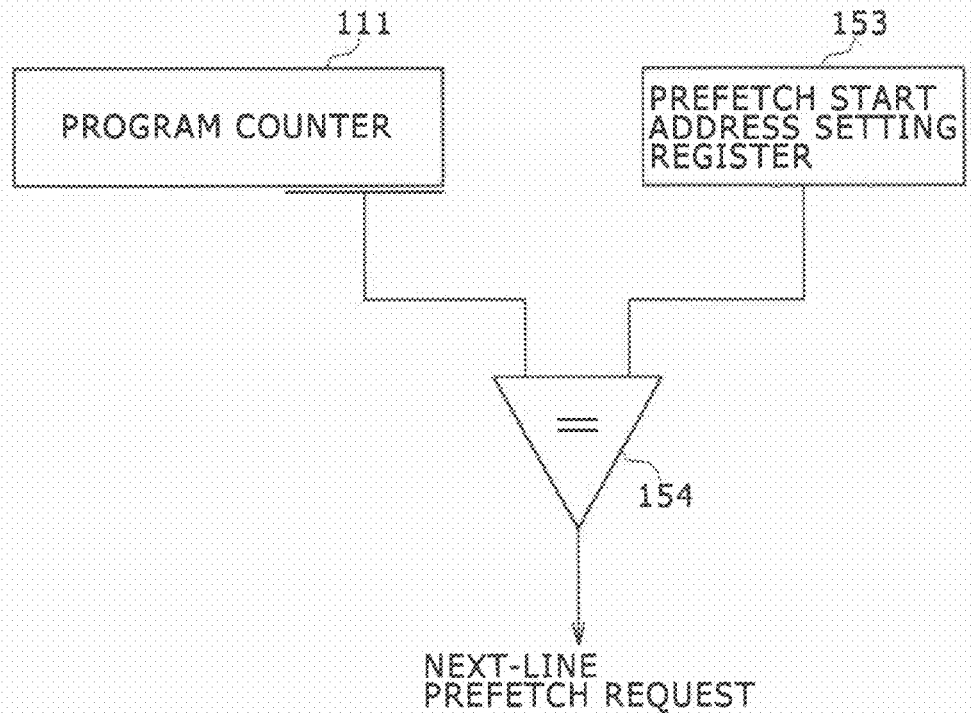
FIGS. 14A and 14B are schematic views showing a configuration example involving the use of a prefetch start address setting register for the second embodiment.

FIGS. 14A and 14B are schematic views showing a configuration example involving the use of a prefetch start address setting register for the second embodiment. As shown in FIG. 14A, this configuration example includes a prefetch start address setting register 153 and an address comparison section 154 constituting part of the next-line prefetch section 150.

The prefetch start address setting register 153 is used to set the address from which to start next-line prefetch in each cache line. The address to be set in this prefetch start address setting register 153 may be a relative address within the cache line. It is assumed that this address is determined at compile time based on, say, the branch instruction frequency of the program. Incidentally, the prefetch start address setting register 153 is an example of the address setting register described in the appended claims.

The address comparison section 154 compares the address set in the prefetch start address setting register 153 with the content of the program counter 111. When detecting a match upon comparison regarding a relative address in the cache line, the address comparison section 154 issues a next-line prefetch request.

According to the above-described configuration example, a desired location in the cache line may be selected as the prefetch start address that is set to the prefetch start address setting register 153. A match may then be detected by the address comparison section 154.

FIG. 14B shows an example of the address set as described. It is assumed that about four prefetch start locations are established in the cache line. Where the cache line is assumed to be 128 bytes long, the cache line may be divided at intervals of 32 bytes to establish four locations: the beginning (byte 0), byte 32, byte 64 (middle), and byte 96. If the instruction set is assumed to contain instructions of 4 bytes (34 bits) long each, the low 2 bits in the binary notation of each instruction address may be ignored. Thus in this case, the low 5 bits from bit 3 to bit 7 need only be compared.

[Use of the Instruction Header]

FIG. 15 is a schematic view showing a configuration example involving the use of the instruction prefetch timing field 312 in the instruction header 310 for the second embodiment. This configuration example uses the instruction prefetch timing field 312 in the instruction header 310 on the assumption that the instruction packet explained above in connection with the first embodiment is being used. Also, the next-line prefetch section 150 is structured to include a set step address register 151 and a multiplication section 152 in addition to the prefetch start address setting register 153 and address comparison section 154 shown in FIG. 14A.

The set step address register 151 is used to hold the granularity for setting the prefetch start address as a step value. For example, if the step value is set for 32 bytes as in the preceding example in which the prefetch start locations are established at the beginning (byte 0), at byte 32, at byte 64, and at byte 96 of the cache line, then the value "32" is held in the set step address register 151.

The multiplication section 152 is used to multiply the value in the instruction prefetch timing field 312 by the step value held in the set step address register 151. Because the instruction prefetch timing field 312 is 2 bits wide as mentioned above, the field is supplemented with a step count held therein that is multiplied by the step value indicated by the set step address register 151. Thus in the instruction prefetch timing field 312 of the instruction header 310, "00" is set to represent the beginning of the cache line (byte 0), "01" to represent byte 32, "10" to represent byte 64, and "11" to represent byte 96. The result of the multiplication by the multiplication section 152 is held in the prefetch start address setting register 153.

The remaining arrangements of the configuration are the same as those in FIG. 14A. The address held in the prefetch start address setting register 153 is compared with the content of the program counter 111 by the address comparison section 154. Upon detection of a match regarding a relative address in the cache line, the address comparison section 154 issues a next-line prefetch request.

In order to facilitate the multiplication by the multiplication section 152 or the address comparison by the address comparison section 154, the step value should preferably be 2 to the n-th power, "n" being an integer.

According to the above-described configuration example, the prefetch start address may be set to the prefetch start address setting register 153 through the use of the instruction prefetch timing field 312 in the instruction header 310.

[Where a Predetermined Instruction Execution Count is Used for Prefetch Timing]

Figure 16:
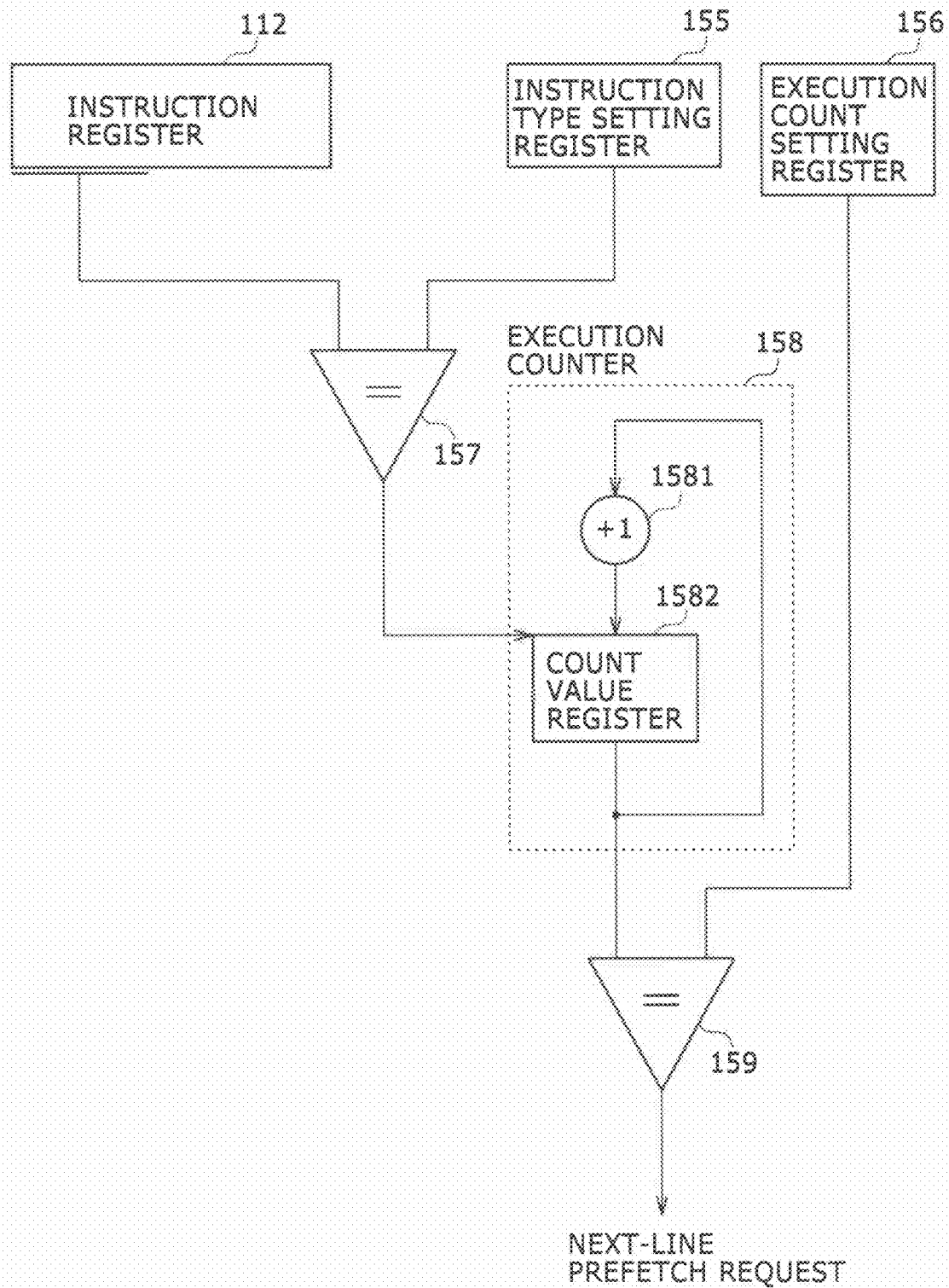
FIG. 16 is a schematic view showing a configuration example involving the use of a predetermined instruction execution count as prefetch timing for the second embodiment.

FIG. 16 is a schematic view showing a configuration example involving the use of a predetermined instruction execution count as prefetch timing for the second embodiment. In the above-described configuration examples of FIGS. 14A, 14B and 15, fixed locations in the cache line were established for use as the prefetch timing. In this configuration example, by contrast, prefetch timing is recognized when a specific type of instruction has been executed a predetermined number of times. This configuration is made up of an instruction type setting register 155, an execution count setting register 156, an instruction type comparison section 157, an execution counter 158, and an execution count comparison section 159 consisting part of the next-line prefetch section 150.

The instruction type setting register 155 is used to set the type of instruction of which the execution count is to be calculated. The applicable instruction types may include instructions of relatively long latencies such as division and load instructions, as well as branch instructions. The long-latency type of instruction may be set here because the entire instruction execution is substantially unaffected even if subsequent instructions are more or less delayed. The branch type of instruction may also be set because there are cases in which the execution of the branch instruction may preferably be awaited in order to determine a subsequent instruction as explained above in reference to FIG. 13.

The execution count setting register 156 is used to set the execution count of the instruction corresponding to the instruction type set in the instruction type setting register 155. When the corresponding instruction is executed the number of times set in the execution count setting register 156, the execution count setting register 156 issues a next-line prefetch request.

The instruction type and the execution count may be determined statically at compile time or dynamically at execution time in accordance with the frequency of instruction appearance included in profile data.

The instruction type comparison section 157 compares the type of the instruction held in the instruction register 112 with the instruction type set in the instruction type setting register 155 for a match. Every time a match is detected, the instruction type comparison section 157 outputs a count trigger to the execution counter 158.

The execution counter 158 calculates the execution count of the instruction corresponding to the instruction type set in the instruction type setting register 155. The execution counter 158 includes an addition section 1581 and a count value register 1582. The addition section 1581 adds "1" to the value in the count value register 1582. The count value register 1582 is a register that holds the count value of the execution counter 158. Every time the instruction type comparison section 157 outputs a count trigger, the count value register 1582 holds the output of the addition section 1581. The execution count is calculated in this manner.

The execution count comparison section 159 compares the value in the count value register 1582 with the value in the execution count setting register 156 for a match. Upon detecting a match, the execution count comparison section 159 issues a next-line prefetch request.

There may be provided a plurality of pairs of the instruction type setting register 155 and execution count setting register 156. In this case, it is necessary to provide execution counters 158 separately. When a match is detected with any one of these pairs, the next-line prefetch request is issued.

[Use of the Instruction Header]

Figure 17:
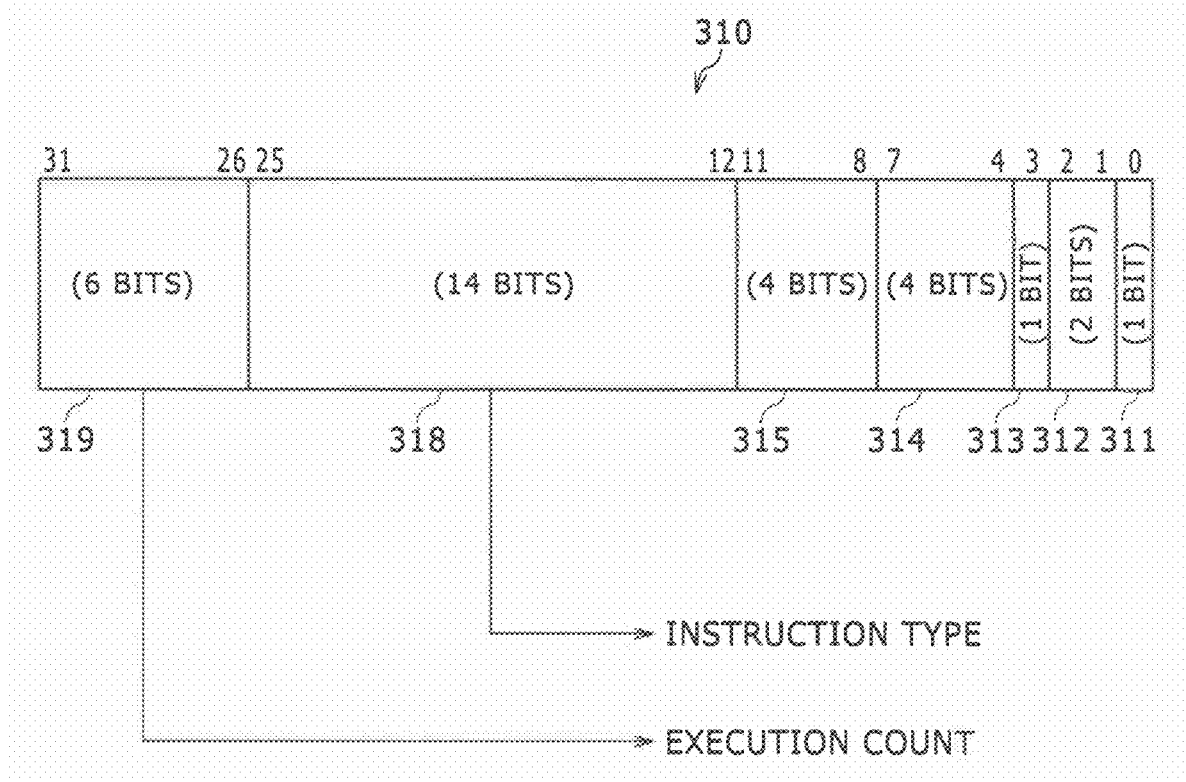
FIG. 17 is a schematic view showing how an instruction type and an execution count are typically set in the instruction header for the second embodiment.

FIG. 17 is a schematic view showing how an instruction type and an execution count are typically set in the instruction header 310 for the second embodiment. In the configuration example of FIG. 16, the instruction type and the execution count were shown set in the instruction type setting register 155 and execution count setting register 156, respectively. Alternatively, these values may be set in the instruction header 310 instead.

In the example of FIG. 17, the instruction type is set in a 14-bit area 318 from bit 12 to bit 25 and the execution count is set in a six-bit area 319 from bit 26 to bit 31 in the instruction header 310. Thus if the value of the area 318 is sent to one input of the instruction type comparison section 157 and the value of the area 319 is supplied to one input of the execution count comparison section 159, it is possible to utilize a predetermined instruction execution count as prefetch timing.

[Instruction Execution Process]

Figure 18:
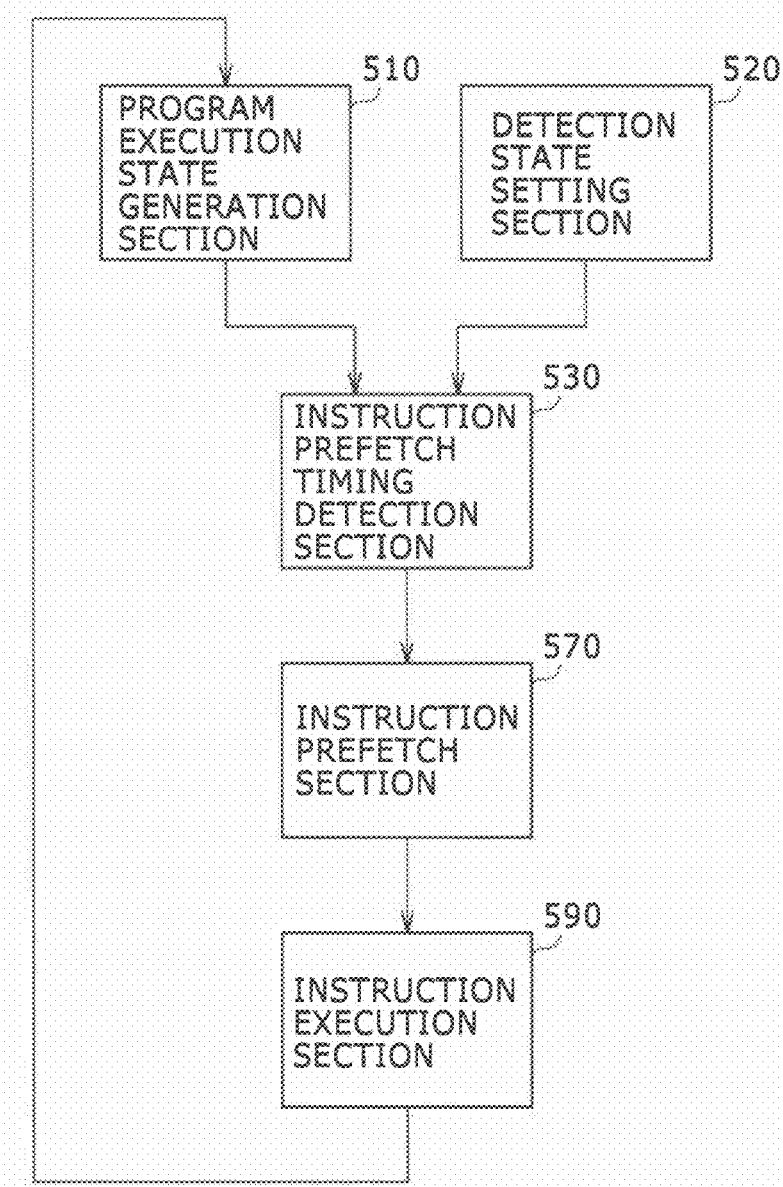
FIG. 18 is a schematic view showing a typical functional structure by which the second embodiment executes instructions.

FIG. 18 is a schematic view showing a typical functional structure by which the second embodiment executes instructions. This example includes a program execution state generation section 510, a detection state setting section 520, an instruction prefetch timing detection section 530, an instruction prefetch section 570, and an instruction execution section 590.

The program execution state generation section 510 generates the execution state of the current program. For example, the program execution state generation section 510 may generate the value of the program counter 111 holding the address of the currently executing instruction as the execution state of the current program. As another example, the program execution state generation section 510 may generate the current execution count of a predetermined instruction type held in the execution counter 158.

The detection state setting section 520 sets the execution state of the program of which the instruction prefetch timing is to be detected. For example, as the program execution state, the detection state setting section 520 may set at least part of the address of the instruction of which the instruction prefetch timing is to be detected, in the prefetch start address setting register 153. As another example, the detection state setting section 520 may set the execution count of a predetermined instruction type in the execution count setting register 156.

The instruction prefetch timing detection section 530 compares the execution state of the current program with the program execution state set in the detection state setting section 520 for a match. In the case of a match between the two states upon comparison, the instruction prefetch timing detection section 530 detects instruction prefetch timing. The address comparison section 154 or the execution count comparison section 159 may be utilized as the instruction prefetch timing detection section 530.

The instruction prefetch section 570 performs instruction prefetch of the next line when the instruction prefetch timing detection section 530 detects instruction prefetch timing.

The instruction execution section 590 executes the instruction acquired by the instruction prefetch section 570. The result of the execution by the instruction execution section 590 affects the execution state of the current program generated by the program execution state generation section 510. That is, the value in the program counter 111 and the value in the execution counter 158 may be updated.

Figure 19:
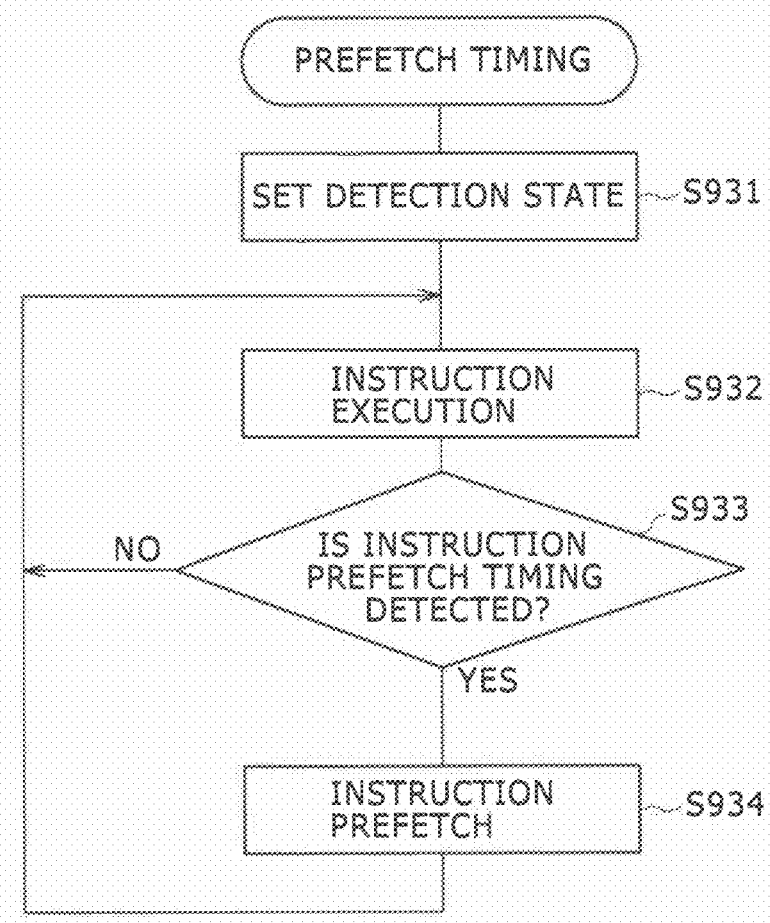
FIG. 19 is a flowchart showing a typical procedure by which the second embodiment executes instructions.

FIG. 19 is a flowchart showing a typical procedure by which the second embodiment executes instructions.

First, the execution state of the program of which the instruction prefetch timing is to be detected is set in the detection state setting section 520 (in step S931). For example, the address of the instruction of which the instruction prefetch timing is to be detected or the execution count of a predetermined instruction type is set in the detection state setting section 520.

The instruction execution state 590 then executes the instruction (in step S932). The instruction prefetch timing detection section 530 detects the instruction prefetch timing (in step S933). For example, if a set instruction address matches the value on the program counter 111 or if the execution count of a predetermined instruction type coincides with the value on the execution counter 158, the instruction prefetch timing detection section 530 detects the instruction prefetch timing. Upon detection of the instruction prefetch timing by the instruction prefetch timing detection section 530, the instruction prefetch section 570 performs instruction prefetch (in step S934).

According to the second embodiment of the present invention, as described above, it is possible to preset the timing for instruction prefetch in order to control the instruction prefetch timing.

3. Third Embodiment

The first and the second embodiments described above were shown to address the control over whether or not to inhibit next-line prefetch. The third embodiment of the invention to be described below, as well as the fourth embodiment to be discussed later, will operate on the assumption that both the next line and the branch destination line are prefetched. The pipeline structure and block structure of the third embodiment are the same as those of the first embodiment and thus will not be explained further.

[Addition Control Process of the Program Counter]

Figure 20:
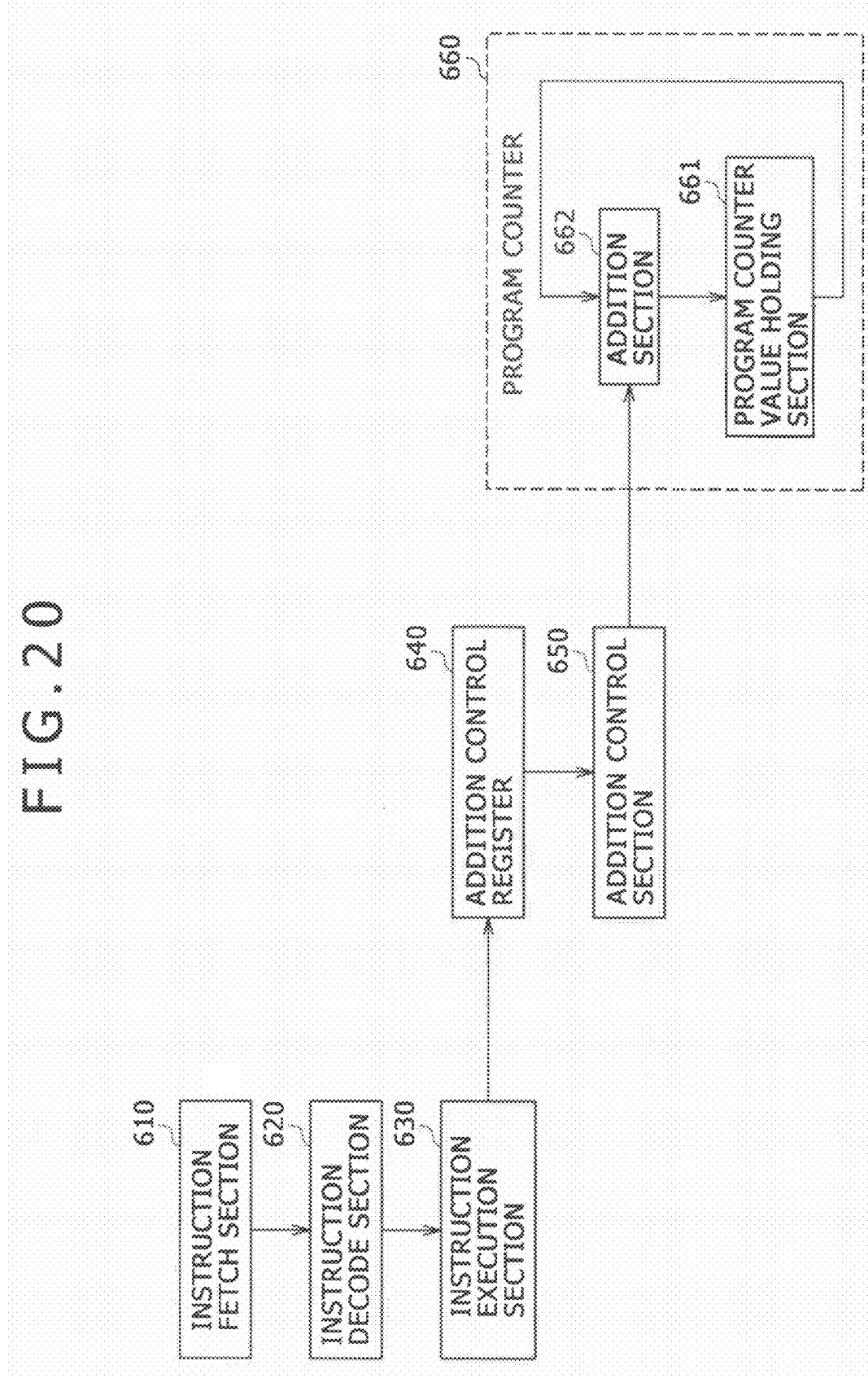
FIG. 20 is a schematic view showing a typical functional structure of a program counter for addition control processing in connection with a third embodiment of the present invention.

FIG. 20 is a schematic view showing a typical functional structure of a program counter for addition control processing in connection with the third embodiment of the present invention. This functional structure example includes an instruction fetch section 610, an instruction decode section 620, an instruction execution section 630, an addition control register 640, an addition control section 650, and a program counter 660.

The instruction fetch section 610 fetches the instruction targeted to be executed in accordance with the value on the program counter 660. The instruction fetch section 610 corresponds to the instruction fetch stage 11. The instruction fetched by the instruction fetch section 610 is supplied to the instruction decode section 620.

The instruction decode section 620 decodes the instruction fetched by the instruction fetch section 610. The instruction decode section 620 corresponds to the instruction decode stage 21.

The instruction execution section 630 executes the instruction decoded by the instruction decode section 620. The instruction execution section 630 corresponds to the instruction execution stage 41. Details about the operand access involved will not be discussed hereunder.

The addition control register 640 holds the data for use in the addition control of the program counter 660. How the addition control register 640 is typically structured will be explained later.

The addition control section 650 performs addition control over the program counter 660 based on the data held in the addition control register 640.

The program counter 660 counts the address of the instruction targeted to be executed. As such, the program counter 660 corresponds to the program counter (PC) 18. The program counter 660 includes a program counter value holding section 661 and an addition section 662. The program counter value holding section 661 is a register that holds the value of the program counter. The addition section 662 increments the value in the program counter value holding section 661.

Figure 21:
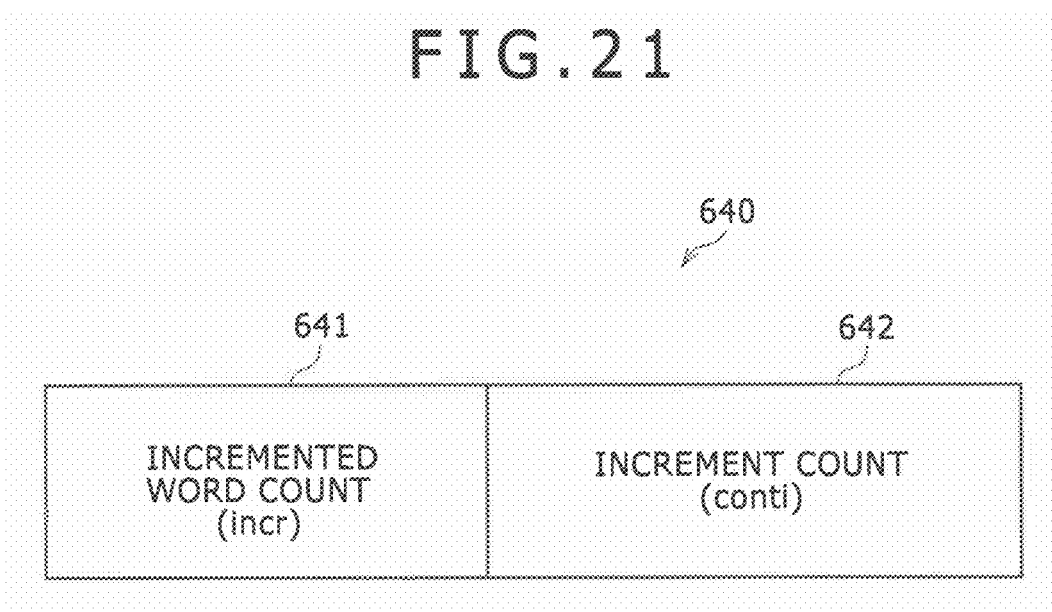
FIG. 21 is a schematic view showing a typical structure of an addition control register for the third embodiment.

FIG. 21 is a schematic view showing a typical structure of the addition control register 640 for the third embodiment. The addition control register 640 holds an incremented word count (incr) 641 and an increment count (conti) 642.

The increment word count 641 is used to hold the incremented word count for use when the value of the program counter value holding section 661 is incremented. The third embodiment presupposes the instruction set of instructions of 32 bits (4 bytes) each, so that one word is 4 bytes long. If the program counter 660 is assumed to hold the address in units of a word by omitting the low 2 bits of the address, then ordinarily an increment value of "1" is added upon every addition. With the third embodiment, by contrast, the value of the incremented word count 641 is added up as the increment. If "1" is set to the incremented word count 641, the operation is carried out in ordinary fashion. If an integer of "2" or larger is set, then the operation can be performed while some instructions are thinned out. Specific examples of the operation will be discussed later. Incidentally, the incremented word count 641 is an example of the increment value register described in the appended claims.

The increment count 642 is used to hold the number of times addition is performed by the addition section 662 in accordance with the incremented word count 641. In an ordinary setup, the increment value "1" is generally added. If an integer of "1" or larger is set to the increment count 642, then addition is carried out in accordance with the incremented word count 641. Alternatively, a subtraction section, not shown, may subtract "1" from the increment count 642 every time the instruction is executed, until the increment count 642 is brought to "0." As another alternative, there may be provided a separate counter that is decremented by "1" every time the instruction is executed, until the value on the counter is brought to "0." In any case, after addition is performed the number of times designated by the increment count 642 in accordance with the incremented word count 641, the usual addition with the increment value "1" is restored. Incidentally, the increment count 642 is an example of the change designation register described in the appended claims.

[How Instructions are Executed]

Figure 22:
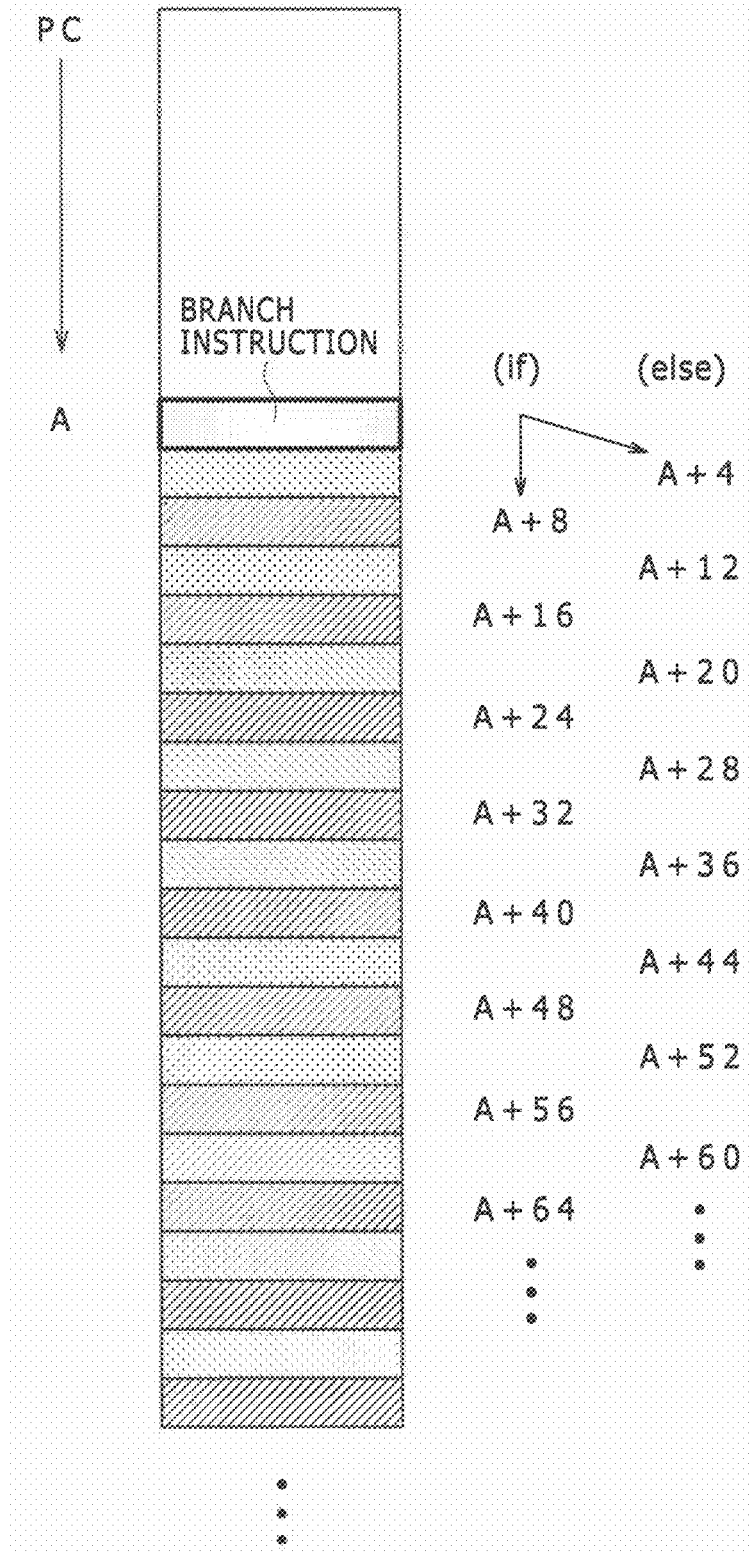
FIG. 22 is a schematic view showing how instructions are processed through two-way branching by the third embodiment.

FIG. 22 is a schematic view showing how instructions are processed through two-way branching by the third embodiment. If reference character A is assumed to represent the address of branch instructions for two-way branching, then the instruction sequence not subject to branching may be arranged to have instructions "A+4," "A+12," "A+20," "A+28," "A+36," "A+44," "A+52," "A+60," etc., sequenced in that order. On the other hand, the instruction sequence subject to branching may be arranged to have instructions "A+8," "A+16," "A+24," "A+32," "A+40," "A+48," "A+56," "A+64,"

etc., sequenced in that order. That is, the instruction sequence not subject to branching and the instruction sequence subject to branching are arranged to alternate with each other.

In the case of the two-way branching above, when the start instruction of each of the two instruction sequences is executed, "2" is set to the incremented word count 641 and the number of the instructions in each instruction sequence is set to the increment count 642. This arrangement makes it possible to execute only one of the two instruction sequences alternating with each other.

Figure 23:
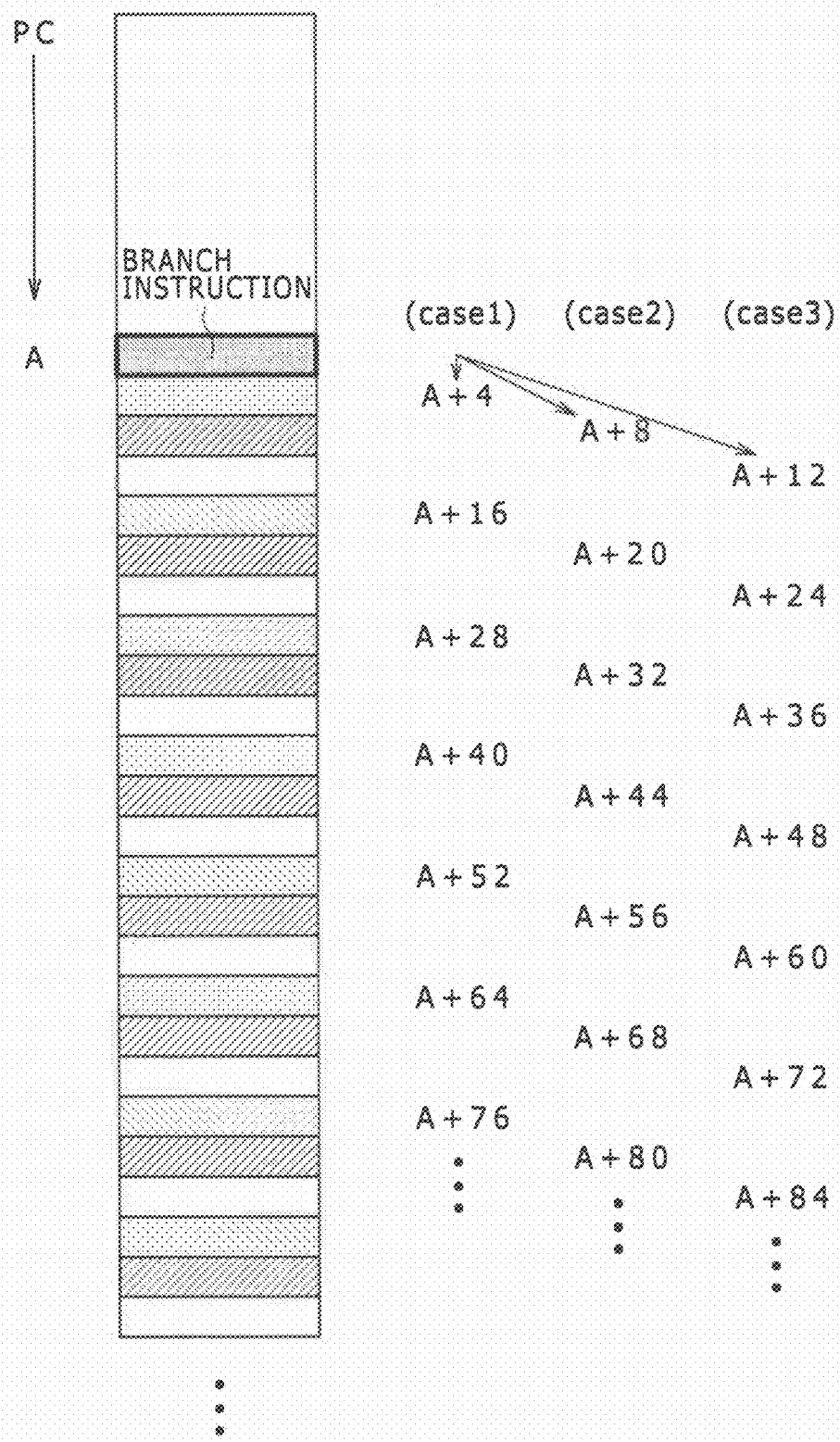
FIG. 23 is a schematic view showing how instructions are processed through multidirectional branching by the third embodiment.

FIG. 23 is a schematic view showing how instructions are processed through multidirectional branching by the third embodiment. Although the technique illustrated in FIG. 23 is an example dealing with three-way branching, the same technique may also be applied to the cases of branching in four ways or more. If reference character A is assumed to represent the address of branch instructions for branching in three ways, then a first instruction sequence may be arranged to have instructions "A+4," "A+16," "A+28," "A+40," "A+52," "A+64," "A+76," etc., sequenced in that order. A second instruction sequence may be arranged to have instructions "A+8," "A+20," "A+32," "A+44," "A+56," "A+68," "A+80," etc., sequenced in that order. And a third instruction sequence may be arranged to have instructions "A+12," "A+24," "A+36," "A+48," "A+60," "A+72," "A+84," etc., sequenced in that order. That is, the first through the third instruction sequences constitute three sequences of staggered instructions that are one instruction apart from one another.

In the case of the three-way branching above, when the start instruction of each of the instruction sequences is executed, "3" is set to the incremented word count 641 and the number of the instructions in each instruction sequence is set to the increment count 642. This arrangement makes it possible to execute only one of the instruction sequences of staggered instructions that are one instruction apart from one another.

[Settings in the Addition Control Register]

FIGS. 24A, 24B, 24C and 24D are schematic views showing a typical instruction set for setting values to the addition control register 640 for the third embodiment. FIG. 24A shows a typical instruction format for use by the third embodiment. This instruction format is made up of a six-bit operation code (OPCODE), a five-bit first source operand (rs), a five-bit second source operand (rt), a five-bit destination operand (rd), and an 11-bit immediate field (imm).

FIG. 24B shows a table of typical operation codes for use by the third embodiment. The high 3 bits of the operation codes are shown in the vertical direction and the low 3 bits thereof are indicated in the horizontal direction of the table. In the ensuing explanation, emphasis will be placed on conditional branch instructions shown at the bottom right of the operation code table and on a control register change instruction with the operation code "100111."

FIG. 24C shows a typical instruction format of a conditional branch instruction. Typical conditional branch instructions of this type are BEQfp, BNEfp, BLEfp, BGTZfp, BLTZfp, BGEZfp, BTLZALfp, and BGEZALfp shown in the table. Reference character B stands for "branch"; EQ following B denotes "equal," a branch condition of whether the values of both source operands are equal (rs=rt); NE following B represents "not equal," a branch condition of whether the values of both source operands are not equal (rs≠rt); LE following B indicates "less than or equal," a branch condition of whether the first source operand is less than or equal to the second source operand (rsrt); GTZ following B stands for "greater than zero," a branch condition of whether the first source operand is greater than zero (rs>0); LTZ following B denotes "less than zero," a branch condition of whether the first source operand is less than zero (rs<0); GEZ following B represents "greater than or equal to zero," a branch condition of whether the first source operand is greater than or equal to zero (rs≥0); AL following BLTZ and BGEZ indicates "branch and link," an operation of retaining the return address upon branching; and "fp" following each of these acronyms stands for "floating point number," indicating that the values of both source operands are floating point numbers. The incremented word count "incr" given as the destination operand is an incremented word count by which to increment the value of the program counter 660. The increment count "conti" given as the immediate field represents the number of times addition is performed by the program counter 660 in accordance with the incremented word count "incr." When these conditional branch instructions are executed, the incremented word count "incr" is set to the incremented word count 641 and the increment count "conti" is set to the increment count 642 in the addition control register 640.

FIG. 24D shows a typical instruction format of a control register change instruction PCINCMODE. The control register change instruction PCINCMODE is an instruction that sets the increment mode of the program counter 660 to the addition control register 640. Executing the control register change instruction PCINCMODE sets the incremented word count "incr" to the incremented word count 641 and the increment count "conti" to the increment count 642 in the addition control register 640. The control register change instruction PCINCMODE is an instruction different from conditional branch instructions. In practice, the control register change instruction PCINCMODE is used in conjunction with conditional branch instructions.

FIG. 25 is a schematic view showing how values are set to the addition control register 640 by a conditional branch instruction for the third embodiment. In this example, a conditional branch instruction BEQfp has the branch condition "rs=rt," incremented word count "2," and increment count "L/2" designated therein. Suppose that the instruction word address of the conditional branch instruction BEQfp is represented by "m." On this assumption, if the branch condition "rs=rt" is met, then instructions "m+2," "m+4," "m+6," ..., up to "m+L" are executed in that order based on the incremented word count "2." On the other hand, if the branch condition "rs=rt" is not met, then instructions "m+1," "m+3," "m+5," ..., up to "m+(L−1)" are executed in that order based on the incremented word count "2."

FIG. 26 is a schematic view showing how values are set to the addition control register 640 by the control register change instruction PCINCMODE for the third embodiment. In this example, the control register change instruction PCINCMODE is placed immediately following an ordinary conditional branch instruction that does not set the addition control register 640. The control register change instruction PCINCMODE is shown having the incremented word count "2" and increment count "L/2" designated therein. It is also assumed here that the instruction word address of the control register change instruction PCINCMODE is represented by "m." On this assumption, if the branch condition of the conditional branch instruction is met, then instructions "m+2," "m+4," "m+6," ..., up to "m+L" are executed in that order based on the incremented word count "2." On the other hand, if the branch condition of the conditional branch instruction is not met, then instructions "m+1," "m+3," "m+5," ..., up to "m+(L−1)" are executed in that order based on the incremented word count "2."

[Instruction Execution Process]

FIG. 27 is a flowchart showing a typical procedure by which the third embodiment executes instructions. It is assumed here that the settings of the incremented word count and the increment count to the addition control register 640 have been completed beforehand using the above-described condition branch instructions and control register change instruction, among others.

If the increment count 642 in the addition control register 640 is larger than zero (in step S941), the value obtained by the program counter 660 multiplying the incremented word count 641 by "4" is added to the program counter value holding section 661 by the addition section 662 (in step S942). In this case, the increment count 642 in the addition control register 640 is decremented by "1" (in step S943). If the increment count 642 in the addition control register 640 is not larger than zero (in step S941), then the value "4" on the program counter 660 is added to the program counter value holding section 661 by the addition section 662 as usual (in step S944). The above steps are repeated. Incidentally, step S942 is an example of the changed increment adding step and step S944 is an example of the ordinary increment adding step, both steps described in the appended claims.

According to the third embodiment of the present invention, as described above, the instructions of suitable instruction sequences are executed by placing in mixed fashion a plurality of instruction sequences subsequent to a branch in units of an instruction and by controlling the addition to the program counter in accordance with the branch condition. This makes it possible to place the next line and the branch destination line in a suitably mixed manner, which averages the penalties involved in instruction prefetch operations.

4. Fourth Embodiment

[Structure of the Processor]

Figure 28:
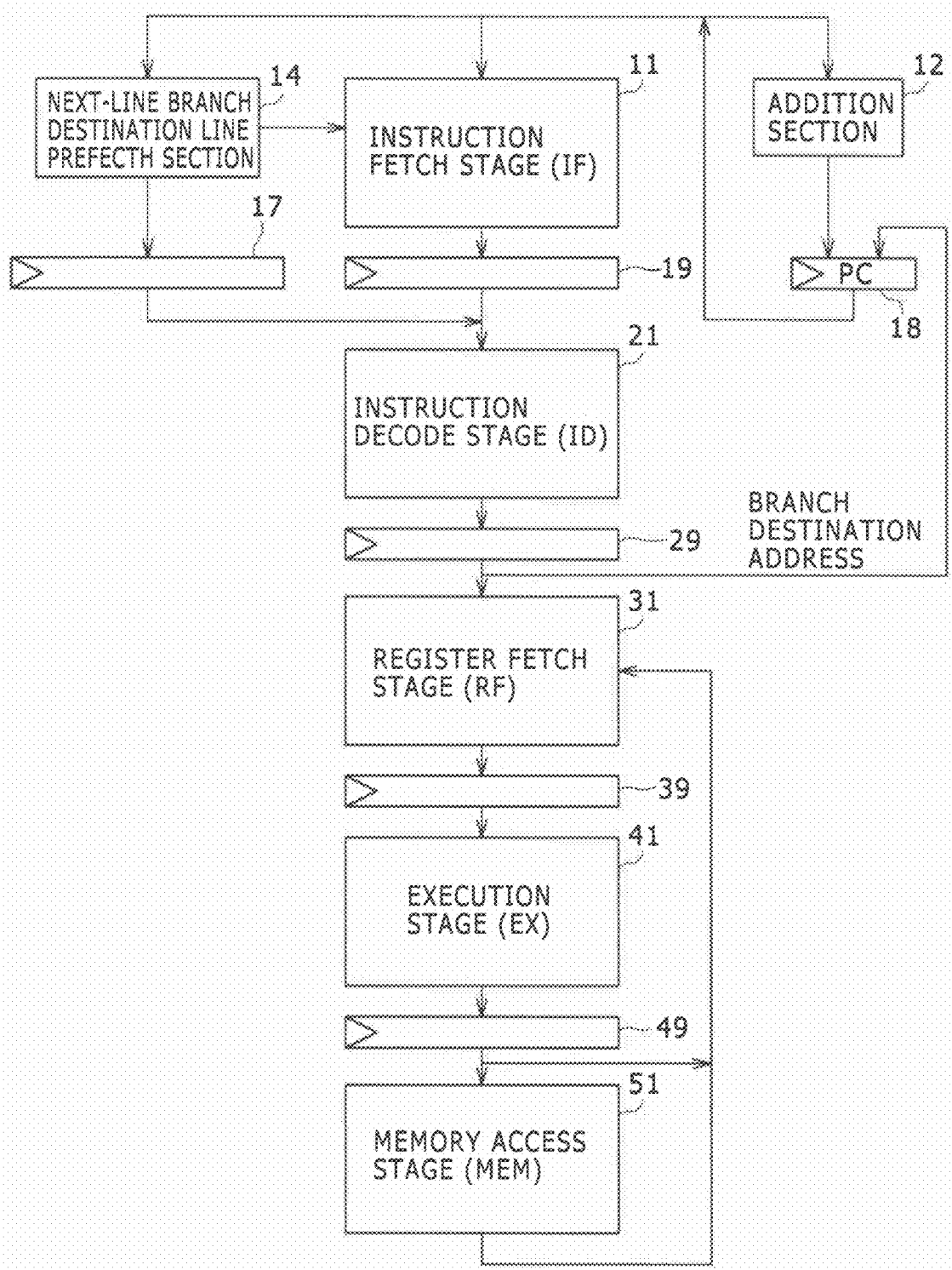
FIG. 28 is a schematic view showing a typical pipeline structure of a processor constituting part of a fourth embodiment of the present invention.

FIG. 28 is a schematic view showing a typical pipeline structure of the processor constituting part of the fourth embodiment of the present invention. The basic pipeline structure of the fourth embodiment is assumed to be made up of five pipeline stages as with the first embodiment explained above.

Whereas the first embodiment described above was shown to have next-line prefetch carried out by the next-line prefetch section 13, the fourth embodiment causes a next-line branch destination line prefetch section 14 to prefetch the next line and branch destination line. That is, what is prefetched is not only the next line, i.e., the cache line next to the cache line containing the instruction currently targeted to be executed, but also the branch destination line that is a cache line including the branch destination instruction. The branch destination line prefetched by the next-line branch destination prefetch section 14 is held in a prefetch queue 17. The branch destination line held in the prefetch queue 17 is supplied to the next instruction decode stage (ID) 21. Since the next line is fed directly from the instruction cache, the next line need not be handled through the prefetch queue 17.

Figure 29:
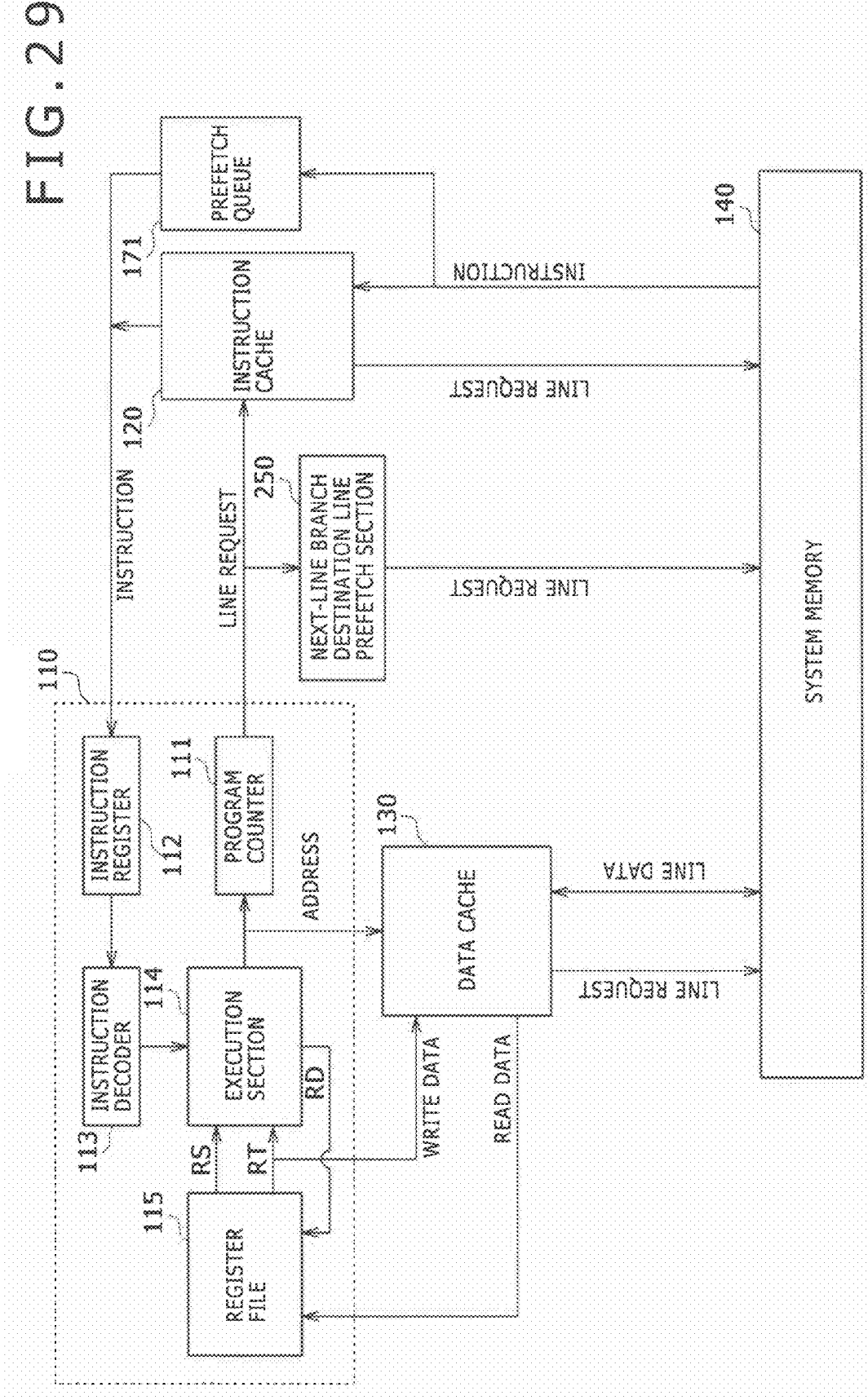
FIG. 29 is a schematic view showing a typical block structure of the processor constituting part of the fourth embodiment.

FIG. 29 is a schematic view showing a typical block structure of the processor constituting part of the fourth embodiment. The basic block structure of the fourth embodiment is the same as that of the first embodiment explained above.

Whereas the above-described first embodiment was shown having the next line prefetched by the next-line prefetch section 150, the fourth embodiment causes a next-line branch destination line prefetch section 250 to prefetch the next line and branch destination line. Also, a prefetch queue 171 is juxtaposed with an instruction cache 120 so that the branch destination line can be fed directly from the prefetch queue 171 to an instruction register 112. That is, if a branch takes place, the instruction from the prefetch queue 171 is supplied, thus bypassing the instruction about to be fed from the instruction cache 120. This arrangement allows the instructions to be issued continuously without stalling the pipeline. Incidentally, the next-line branch destination line prefetch section 250 is an example of the prefetch section and the prefetch queue 171 is an example of the prefetch queue, both described in the appended claims.

Since it is not mandatory for the fourth embodiment to divide instructions into instruction packets, that facility is excluded from the block structure. Also, the compression based on reference to the instruction dictionary table is not mandatory for the fourth embodiment, so that this facility is excluded from the block structure. These facilities may be implemented in combination as desired.

[Relations Between the Branch Instruction and the Cache Line]

Figure 30:
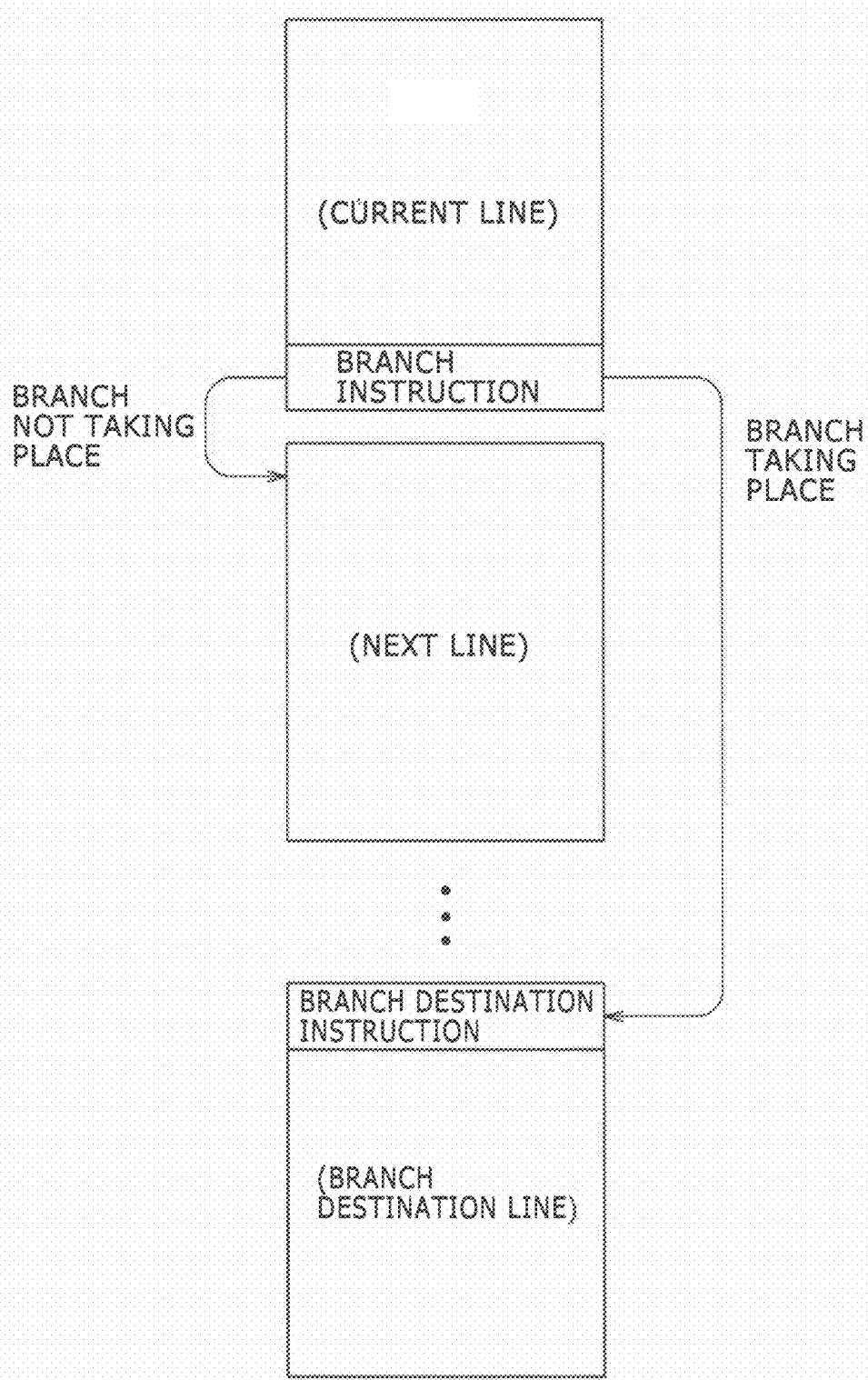
FIG. 30 is a schematic view showing typical relations between a branch instruction and a cache line for the fourth embodiment.

FIG. 30 is a schematic view showing typical relations between a branch instruction and a cache line for the fourth embodiment.

The cache line containing the instruction currently targeted to be executed is called the current line, and the cache line immediately following the current line is called the next line. The cache line containing the branch destination instruction of the branch instruction included in the current line is called the branch destination line. In this example, a branch instruction is placed at the end of the current line. This placement is intended to have the next line and the branch destination line prefetched at the time when the start instruction of the current line is executed, so that both lines will have been prefetched before the branch instruction is executed. Thus it may not be necessary to place the branch instruction at the end of the current line. If located at least in the latter half of the current line, the branch instruction may in some cases be reached in time for the prefetch to be completed.

If the branch instruction is placed at the end of the current line and if the branch condition of that branch instruction is not met and a branch does not take place accordingly, then the next line is needed. If the branch condition is met and the branch occurs accordingly, then the branch destination line is needed. Thus in order to perform the prefetch successfully regardless of the branch condition being met or not met, it is preferable to prefetch both the next line and the branch destination line. The fourth embodiment gets the next-line branch destination line prefetch section 250 to prefetch both lines so as to execute the instructions continuously independent of the branch condition being met or not met. In this case, the throughput should preferably be double that of the normal setup in order to prefetch both lines, but this is not mandatory.

In view of the collisions of cache lines in the instruction cache 120, it is preferable to put constraints on the placement of the branch destination line. For example, where the instruction cache 120 operates on the direct mapping principle, the cache lines having the same line address will collide with one another if an attempt is made to cache them at the same time. In this case, if the prefetched next line is followed immediately by a prefetched branch destination line having the same line address, the next line is driven out of the instruction cache 120. Where the two-way set associative principle is in effect, the possibility of such collisions is reduced. Still, depending on the cached state, the prefetched branch destination line can affect other cache lines. Thus with the fourth embodiment, the instruction cache is assumed to operate on the direct mapping principle as the most stringent condition. The placement of the branch destination line is then adjusted by a compiler or by a linker in such a manner that the next line and the branch destination line will not have the same line address.

Where the placement of instruction addresses is to be changed by the compiler or by the linker, the technique explained below may be used as an example. An instruction sequence shown below is assumed here, in which the numbers subsequent to "0x" are hexadecimal numbers.

0x0000: instruction A
0x0004: instruction B
0x0008: instruction C

If the placement of the instructions in the above instruction sequence is desired to be shifted by 4 bytes backward, a NOP (no-operation) instruction may be inserted into the sequence as follows:

0x0000: NOP instruction
0x0004: instruction A
0x0008: instruction B
0x000C: instruction C If the instruction A is an instruction that causes a plurality of operations to be performed when executed, then the instruction A may be divided into an instruction AA and an instruction AB as shown below. This arrangement can also shift the placement of the instructions in the above instruction sequence by 4 bytes backward.

Figure 31A:
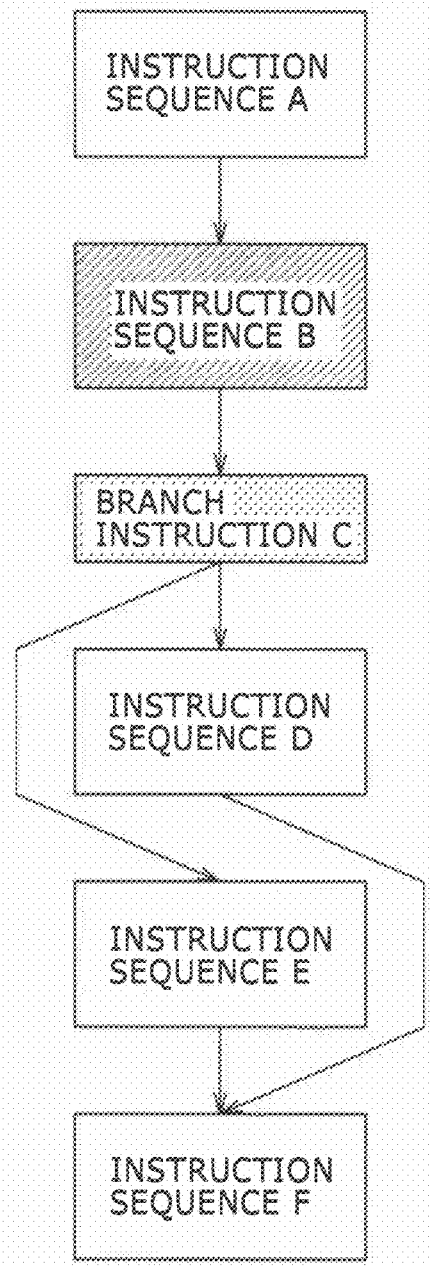
FIGS. 31A and 31B are schematic views showing how the placement of instructions is typically changed by the fourth embodiment.
Figure 31B:
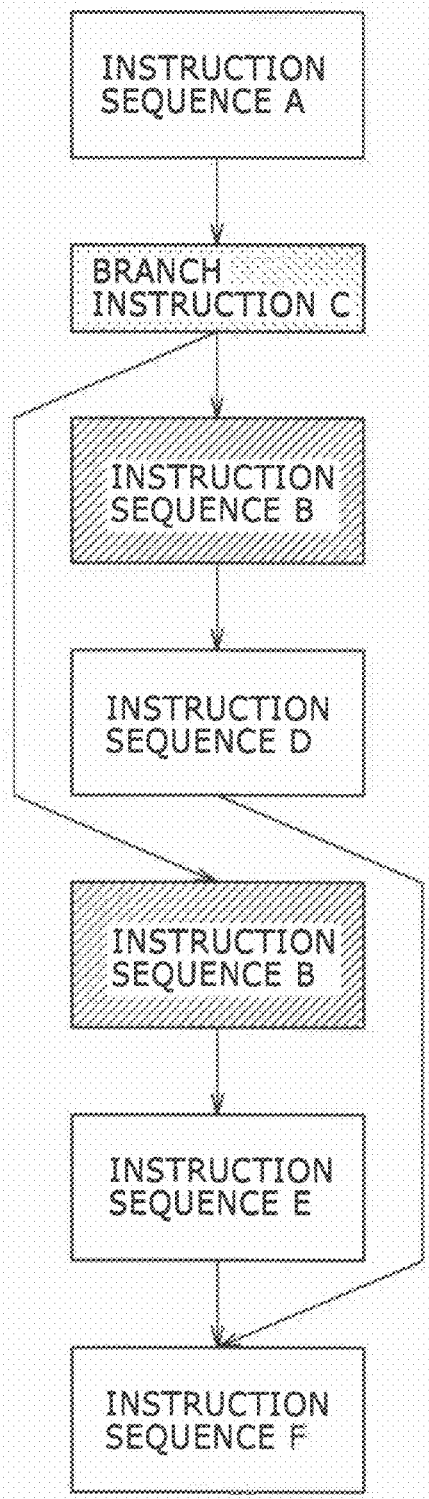

0x0000: instruction AA
0x0004: instruction AB
0x0008: instruction B
0x000C: instruction C FIGS. 31A and 31B are schematic views showing how the placement of instructions is typically changed by the fourth embodiment. As shown in FIG. 31A, consider a program in which instruction sequences A and B are followed by a branch instruction C branching either to an instruction sequence D or to an instruction sequence E for processing, followed by the processing of an instruction sequence F. In this case, if the result of the instruction sequence B does not affect the branch condition of the branch instruction C, then the branch instruction C may be moved to immediately behind the instruction sequence A, with the instruction sequence B placed at the branch destination as shown in FIG. 31B. In this manner, the placement of the instructions can be changed without affecting the result of the execution.

[Instruction Placement Process]

FIG. 32 is a schematic view showing a typical functional structure by which the fourth embodiment places instructions. This functional structure example presupposes that an object code is generated from the program held in a program holding section 701 and that the generated object code is held in an object code holding section 702. The structure example includes a branch instruction extraction section 710, a branch instruction placement section 720, a branch destination instruction placement section 730, and an object code generation section 740.

The branch instruction extraction section 710 extracts a branch instruction from the program held in the program holding section 701. The branch instruction extraction section 710 acquires the address of the extracted branch instruction in the program and supplies the address to the branch instruction placement section 720. Also, the branch instruction extraction section 710 acquires the branch destination address of the extracted branch instruction and feeds the branch destination address to the branch destination instruction placement section 730.

The branch instruction placement section 720 places the branch instruction extracted by the branch instruction extraction section 710 into the latter half of the cache line (current line). The branch instruction is placed in the latter half of the cache line so that the prefetch will be completed before the branch instruction is reached, as discussed above. From that point of view, it will be best to place the branch instruction at the end of the cache line.

The branch destination instruction placement section 730 places the branch destination instruction of the branch instruction extracted by the branch instruction extraction section 710 into another cache line (branch destination line) having a line address different from that of the next cache line (next line). The next line and the branch destination line are placed into different cache lines having different line addresses so as to avoid collisions in the instruction cache 120, as explained above.

The object code generation section 740 generates an object code of the instruction sequence containing the branch instruction and the branch destination instruction placed therein by the branch instruction placement section 720 and branch destination instruction placement section 730. The object code generated by the object code generation section 740 is held in the object code holding section 702. Incidentally, the object code generation section 740 is an example of the instruction sequence output section described in the appended claims.

FIG. 33 is a flowchart showing a typical procedure by which the fourth embodiment places instructions.

First, the branch instruction extraction section 710 extracts a branch instruction from the program held in the program holding section 701 (in step S951). The branch instruction extracted by the branch instruction extraction section 710 is placed into the latter half of the cache line (current line) by the branch instruction placement section 720 (in step S952). The branch destination instruction of the branch instruction extracted by the branch destination instruction extraction section 710 is placed into another cache line (branch destination line) having a line address different from that of the next cache line (next line) by the branch destination instruction placement section 730 (in step S953). The object code generation section 740 then generates an object code from the instruction sequence containing the branch instruction and branch destination instruction placed therein by the branch instruction placement section 720 and branch destination instruction placement section 730 (in step S954).

Incidentally, step S951 is an example of the branch instruction extracting step; step S952 is an example of the branch instruction placing step; step S953 is an example of the branch destination instruction placing step; and step S954 is an example of the instruction sequence outputting step, all steps described in the appended claims.

[Setting of the Prefetch Address]

FIGS. 34A and 34B are schematic views showing how a prefetch address register is typically set by the fourth embodiment. As discussed above, the branch destination line is placed at a line address different from that of the next line. Whereas the branch destination line may be prefetched in a permanently fixed manner using the location relative to the current line, the branch destination address may alternatively be set in automatic fashion every time a branch takes place, as described below.

FIG. 34A shows a typical structure of a prefetch address register (PRADDR) 790. The prefetch address register 790 is used to set the prefetch address from which the branch destination line is prefetched into the instruction cache 120. The prefetch address is held in the low 12 bits of the prefetch address register 790.

FIG. 34B shows an instruction format of an MTSI_PRADDR (move to special register immediate-PRADDR) instruction for setting values to the prefetch address register 790. The MTSI_PRADDR instruction is one of special instructions and is used to set immediate values to a specific register (prefetch address register 790 in this case). The bits 17 through 21 of this instruction represent the prefetch address register PRADDR. The bits 11 through 8 of this instruction are set to the bits 11 through 8 of the prefetch address register 790. These settings establish the address of the branch destination line to be prefetched. It is assumed here that the instruction cache 120 is a 4K-byte cache operating on the two-way set associative principle and offering a total of 16 lines (8 lines for each way) to constitute an entry size of 256 bytes.

As another example, it is possible to resort to the division into instruction packets 300 explained above in connection with the first embodiment and to utilize the prefetch setting field 315 of the instruction header 310. In this case, the prefetch setting field 315 from bit 11 to bit 8 in the instruction header 310 of FIG. 4 are set to bits 11 through 8 in the prefetch address register. This makes it possible to set the address of the branch destination line targeted to be prefetched without recourse to the special instructions.

[Instruction Execution Process]

Figure 35:
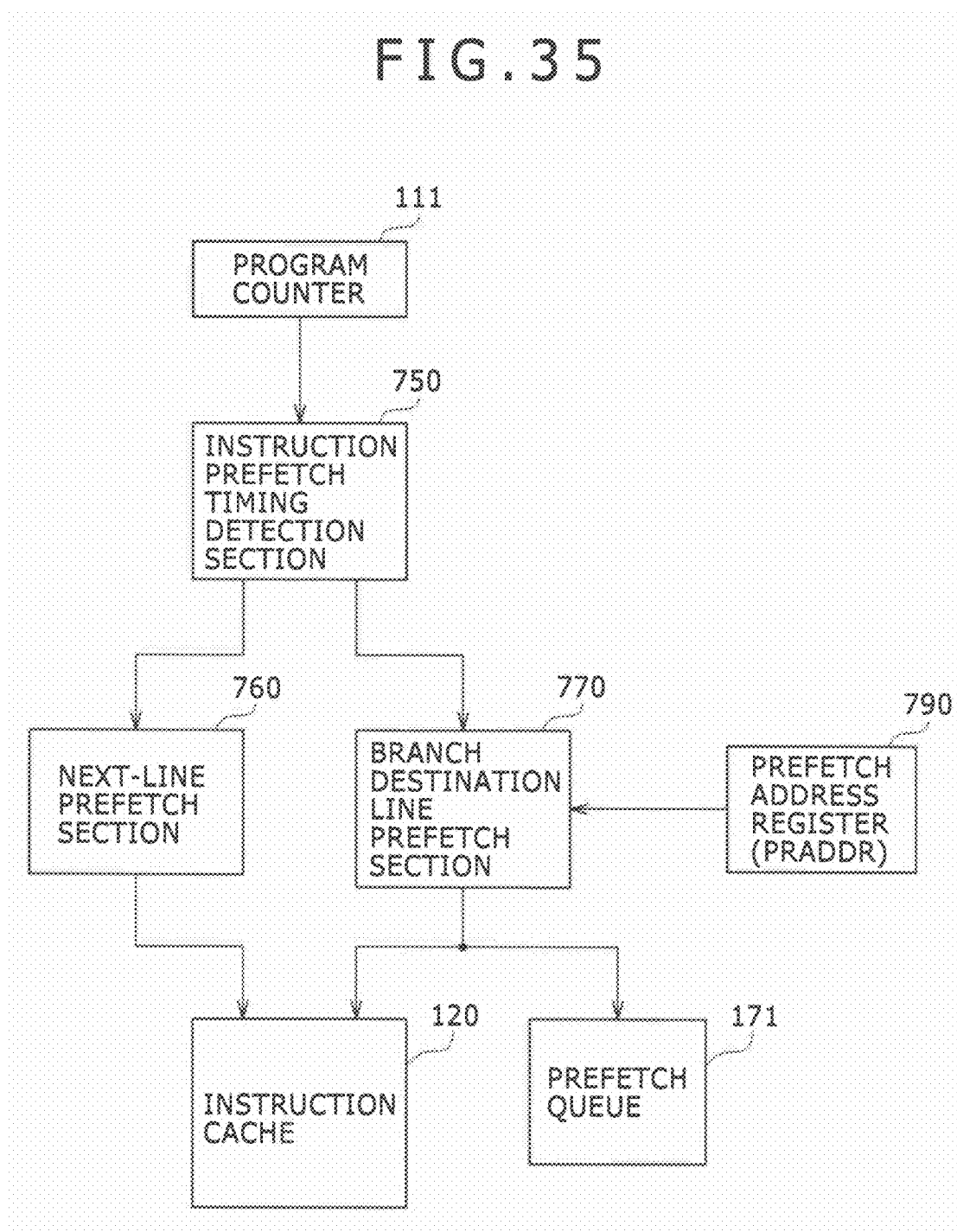
FIG. 35 is a schematic view showing a typical functional structure by which the fourth embodiment executes instructions.

FIG. 35 is a schematic view showing a typical functional structure by which the fourth embodiment executes instructions. This structure example presupposes that lines are prefetched to the instruction cache 120 and prefetch queue 171 based on the detected state of the program counter 111. The structure example includes a prefetch timing detection section 750, a next-line prefetch section 760, and a branch destination prefetch section 770. These components correspond to the next-line branch destination line prefetch section 250 in the block structure.

The prefetch timing detection section 750 detects the instruction prefetch timing by referencing the state of the program counter 111. With the fourth embodiment, it is preferable to start prefetching at an early stage in order to prefetch the next line and the branch destination line in two ways. Thus the instruction prefetch timing may be detected when, say, the start instruction of the cache line starts to be executed.

The next-line prefetch section 760 prefetches the next line. The next line prefetched from the system memory 140 is stored into the instruction cache 120.

The branch destination line prefetch section 770 prefetches the branch destination line. The cache line at a fixed location relative to the current line may be used as the branch destination line. Alternatively, the address set in the above-described prefetch address register 790 may be used. The branch destination line prefetched from the system memory 140 is stored into the instruction cache 120 and prefetch queue 171.

FIG. 36 is a flowchart showing a typical procedure by which the fourth embodiment executes instructions.

First, the prefetch timing detection section 750 detects that the start instruction of the cache line starts getting executed (in step S961). Then the next-line prefetch section 760 prefetches the next line (in step S962). The branch destination line prefetch section 770 prefetches the branch destination line (in step S963). These steps are repeated, whereby the instruction sequences of the next line and the branch destination line are prefetched in two ways.

According to the fourth embodiment of the present invention, as described above, the branch destination line is arranged to have a line address different from that of the next line so that the instruction sequences of the next line and the branch destination line are prefetched in two ways. This structure helps enhance the throughput.

5. Combinations of the Embodiments

The foregoing paragraphs discussed separately the first through the fourth embodiments of the present invention. Alternatively, these embodiments may be implemented in diverse combinations.

[Combining the First Embodiment with the Second Embodiment]

The first embodiment was shown to determine whether or not to perform prefetch in accordance with the branch prediction flag 311 in the instruction header 310. In order to avoid a failed prediction in the determination, the first embodiment may be combined effectively with the second embodiment. That is, the second embodiment is used to delay the determination of the prefetch so as to determine definitively the existence or the absence of a branch beforehand, whereby the correct cache line is prefetched.

[Combining the First or the Second Embodiment with the Third Embodiment]

The third embodiment performs the prefetch in two ways. That means it is difficult to apply the third embodiment to some cases, such as where the branch instruction has a branch destination with a distant address and where the "if" statement has no "else" clause. For example, if all cases of multi-directional branches do not have the same number of instructions, it is necessary to insert NOP instructions until the number of instructions becomes the same for all cases. In the case of a relatively long instruction sequence, the throughput of instruction execution and the efficiency of using the cache tend to decline. As a countermeasure against these difficulties, the branch prediction flag 311 of the first embodiment may be used to inhibit two-way prefetch where the possibility of branching to a distant address is found high. This arrangement averts the disadvantage of the third embodiment. The disadvantage of the third embodiment is also avoided using the second embodiment that delays the instruction prefetch timing to let the existence or the absence of a branch be definitively determined beforehand, whereby needless prefetch is inhibited.

[Combining the First or the Second Embodiment with the Fourth Embodiment]

The fourth embodiment was shown always to prefetch the next line and the branch destination line. This structure entails the disadvantage of needlessly prefetching the branch destination line if the current line does not contain a branch instruction. Thus the branch destination flag 311 of the first embodiment is used to determine the possibility of executing the next line. If the possibility of executing the next line is found high based on the branch destination flag 311, only the next line is prefetched. This arrangement averts the disadvantage of the fourth embodiment. The disadvantage of the fourth embodiment is also avoided using the second embodiment that delays the instruction prefetch timing to let the existence or the absence of a branch be definitively determined beforehand, whereby needless prefetch is inhibited.

[Combining the Third Embodiment with the Fourth Embodiment]

The fourth embodiment was shown to prefetch the next line and the branch destination line in two ways. Where the third embodiment is also used in combination, it is possible to perform multidirectional branching in three ways or more. That is, by prefetching in two ways the cache line in which a plurality of instruction sequences coexist, it is possible to implement multidirectional branching.

In the above combination, the third embodiment may be applied to cases with a limited scope of branching such as that of the line size, whereas the fourth embodiment may be used to deal with more extensive branching. The selective implementation of the third and the fourth embodiments can avert the disadvantages of both of them. That is, the fourth embodiment has the disadvantage of always using the instruction cache at half the rate of efficiency while keeping the throughput of execution undiminished. The third embodiment has the disadvantage of not being appreciably effective when applied to cases of extensive branching. The two embodiments may thus be combined to cancel out their disadvantages.

[Other Combinations]

Combinations of the embodiments other than those outlined above may also be implemented to enhance the effects of the individual embodiments. For example, the combination of the first or the second embodiment, of the third embodiment, and of the fourth embodiment reinforces the effects of the embodiments involved.

The embodiments and their variations described above are merely examples in which the present invention may be implemented. As is clear from above, the particulars of the embodiments and their variations in the description of the preferred embodiments correspond basically to the inventive matters claimed in the appended claims. Likewise, the inventive matters named in the appended claims correspond basically to the particulars with the same names in the description of the preferred embodiments. However, these embodiments and their variations and other examples of the present invention are not limitative thereof, and it should be understood by those skilled in the art that various modifications, combinations, sub-combinations and alterations may occur depending on design requirements and other factor in so far as they are within the scope of the appended claims or the equivalents thereof.

Furthermore, the series of steps and processes discussed above as part of the embodiment may be construed as methods for carrying out such steps and processes, as programs for causing a computer to execute such methods, or as a recording medium that stores such programs. Examples of the recording medium include CD (Compact Disc), MD (MiniDisc), DVD (Digital Versatile Disk), memory cards, and Blu-ray Discs (registered trademark).

The present application contains subject matter related to that disclosed in Japanese Priority Patent Application JP 2010-075782 filed in the Japan Patent Office on Mar. 29, 2010, the entire content of which is hereby incorporated by reference.

What is claimed is:

1. An electronic device comprising:
   circuitry configured to function as
      a program counter configured to manage an address of an instruction targeted to be executed in a program in which instructions belonging to a plurality of instruction sequences are placed sequentially;
      a change designation register configured to designate a change of an increment value on the program counter;
      an increment value register configured to hold the changed increment value; and
      an addition control section configured such that if the change designation register designates the change of the increment value on the program counter, then the addition control section increments the program counter based on the changed increment value held in the increment value register, the addition control section further incrementing the program counter by an instruction word length if the change designation register does not designate any change of the increment value on the program counter, wherein
      the change designation register is decremented every time the program counter is incremented based on the changed increment value held in the increment value register, the change designation register further designating the change of the increment value on the program counter if the change designation register indicates a positive number.

2. The instruction fetch apparatus according to claim 1, wherein the increment value register holds a number of the instruction sequences as the changed increment value.

3. The instruction fetch apparatus according to claim 2, wherein, following execution of a branch instruction branching in a predetermined number of directions, the increment value register holds the predetermined number as the number of the instruction sequences.

4. A processor comprising:
   a program counter configured to manage an address of an instruction targeted to be executed in a program in which instructions belonging to a plurality of instruction sequences are placed sequentially;
   a change designation register configured to designate a change of an increment value on the program counter;
   an increment value register configured to hold the changed increment value;
   an addition control section configured such that if the change designation register designates the change of the increment value on the program counter, then the addition control section increments the program counter based on the changed increment value held in the increment value register, the addition control section further incrementing the program counter by an instruction word length if the change designation register does not designate any change of the increment value on the program counter; and
   an instruction execution section configured to execute the instruction indicated by the program counter, wherein
   the change designation register is decremented every time the program counter is incremented based on the changed increment value held in the increment value register, the change designation register further designating the change of the increment value on the program counter if the change designation register indicates a positive number.

5. A program counter addition control method for use with circuitry configured to function as a program counter configured to manage an address of an instruction targeted to be executed, a change designation register configured to designate a change of an increment value on the program counter, and an increment value register configured to hold the changed increment value, the program counter addition control method comprising the steps of:
   if said change designation register designates the change of the increment value on the program counter, then incrementing the program counter based on the changed increment value held in the increment value register; and
   if the change designation register does not designate any change of the increment value on the program counter, then incrementing the program counter by an instruction word length, wherein
   the change designation register is decremented every time the program counter is incremented based on the changed increment value held in the increment value register, the change designation register further designating the change of the increment value on the program counter if the change designation register indicates a positive number.

* * * * *